United States Patent [19]

Gogins

[11] Patent Number: 4,936,155
[45] Date of Patent: Jun. 26, 1990

[54] INFINITE SPEED VARIATION, CONSTANT POWER, RIPPLE-FREE TRANSMISSION

[75] Inventor: Laird B. Gogins, Salt Lake City, Utah

[73] Assignee: Utah Transmission Corporation, Salt Lake City, Utah

[21] Appl. No.: 276,472

[22] Filed: Nov. 25, 1988

Related U.S. Application Data

[63] Continuation-in-part of Ser. No. 753,044, Jul. 2, 1985, abandoned.

[51] Int. Cl.⁵ .................. F16H 29/04; F16H 29/10
[52] U.S. Cl. .......................... 74/117; 74/124
[58] Field of Search ............ 74/117, 124, 122, 123

[56] References Cited

U.S. PATENT DOCUMENTS

| | | | |
|---|---|---|---|
| 1,770,132 | 7/1930 | von Soden-Fraunhofen | 74/124 |
| 1,954,767 | 4/1934 | Foster | 74/124 |
| 2,159,739 | 5/1939 | Johnson | 74/124 X |
| 2,554,463 | 5/1951 | Klamp | 74/124 |
| 2,716,348 | 8/1955 | Brandt | 74/124 |
| 2,983,154 | 5/1961 | Newkirch | 74/117 |
| 3,229,549 | 1/1966 | Riedl | 74/124 |
| 3,517,913 | 6/1970 | van Rossem | 74/569 X |
| 3,572,423 | 5/1970 | Schuitemaker | 74/117 X |
| 3,803,931 | 4/1974 | Bianchini et al. | 74/117 |
| 3,915,129 | 10/1975 | Rust et al. | 123/90.18 |
| 4,116,083 | 9/1978 | Gogins | 74/393 |
| 4,378,707 | 4/1983 | Jeffries | 74/117 |
| 4,487,085 | 12/1984 | Collins | 74/113 |

FOREIGN PATENT DOCUMENTS

| | | | |
|---|---|---|---|
| 590087 | 3/1925 | France | 74/124 |
| 460047 | 10/1950 | Italy | 74/117 |

OTHER PUBLICATIONS

"Mechanical Computing Mechanisms" by Robert R. Reid and Du Ray E. Stromback; from Mechanisms, Linkages and Mechanical Controls, Edited by E. P. Chironis (1965) M-H Company.

*Primary Examiner*—Dirk Wright
*Attorney, Agent, or Firm*—Trask, Britt & Rossa

[57] ABSTRACT

A variable transmission having an input shaft, a lobed cam slidably splined on said shaft, and a plurality of pivotedly mounted cam followers which mechanically engage the cam is disclosed. The cam follwers are connected to an output shaft through intermediation of a one-way clutch mechanism. Each cam follower includes a steerable contact member whose orientation may be modified to induce a coaxially directioned, displacing force on the cam. The displacement of the cam effects a shifting of the transmission ratio.

45 Claims, 23 Drawing Sheets

INFINITE SPEED VARIATION, CONSTANT POWER, RIPPLE-FREE TRANSMISSION

This is a continuation-in-part application of Ser. No. 753,044 entitled, "Infinite Speed Variation, Constant Power, Ripple-Free Transmission," filed on July 2, 1985 and now abandoned.

BACKGROUND OF THE INVENTION

1. Field of the Invention

The present invention relates generally to apparatus and methods for changing speed and torque from a prime mover. More particularly, the invention pertains to apparatus and method for selecting infinite speed and torque variations for vehicles, wind turbines and industrial speed changers through selected use of a variable throw cam designed to smoothly produce selected, ripple-free speeds and torques.

2. Statement of the Art

Numerous systems and methods have been proposed to change the speed and torque from a prime mover. The present invention relates generally to that class of variable and fixed speed transmissions described as ratchet drives and more particularly to the control mechanisms employed with such drives. Transmissions of this type, known previously, include variable throw eccentrics, variably displaced fulcrums and/or variable length lever arms adapted to produce speed variations. Such systems are shown, for example, in U.S. Pat. No. 3,803,931; U.S. Pat. No. 3,517,913; U.S. Pat. No. 3,229,549; U.S. Pat. No. 3,073,173; U.S. Pat. No. 2,199,052; U.S. Pat. No. 2,159,739; U.S. Pat. No. 3,915,129; Italian Patent No. 460047 and French Patent No. 590,087.

Some of these known systems utilize planetary arrays of one-way clutches while others utilize in-line arrays. Various means of selecting the input-output ratios of the systems have been proposed.

Another known transmission is shown in U.S. Pat. No. 4,116,083. This transmission reverts the power train so that the common shaft is an input shaft instead of an output or stator shaft. In this transmission, the housing operates as the output member.

U.S. Pat. No. 1,770,132 (Van Soden-Fraunhofen) discloses a gear system having cam followers positioned to ride atop a cam turned by an input shaft. A lateral movement of the input shaft displaces the followers on the cam to change the drive ratio between input and output shafts.

U.S. Pat. No. 1,954,767 (Foster) discloses a variable speed transmission wherein a cam is moved to change speed ratio and wherein followers ride on the cams.

U.S. Pat. No. 2,554,463 (Klamp) discloses a variable speed transmission having a plurality of cam followers arranged in a substantially circular spacing about a cam. Klamp suggests positioning the cam followers such that alternate followers are simultaneously rotated in a common direction during the same time period that the remaining cam followers are rotated in an opposite direction. This interrelationship facilitates the connection of adjacent pairs of cam followers by tension springs which act as a means of retaining the cam followers in contact with the cam.

U.S. Pat. No. 2,983,154 (Neukirch) suggests a variable speed mechanical transmission having a plurality of cam followers spacedly positioned about a centrally positioned cam. Neukirch discloses housing-mounted springs which abut against the cam followers and urge them into engagement against the cam. In one embodiment (FIG. 10), Neukirch suggests the placement of a roller on the cam follower.

U.S. Pat. No. 3,803,931 (Bianchini et al.) discloses a variable speed transmission having two sets of cam followers positioned in a substantially circular, spaced orientation about a central cam. A set of cam followers is shown positioned on each of the opposing sides of the disc-like cam.

U.S. Pat. No. 4,487,085 (Collins) discloses an infinitely variable transmission wherein a cam follower includes a rotatably mounted roller which is mounted within a yoke formed within the cam follower.

In applicant's co-pending U.S. Pat. application, Ser. No. 753,044, filed July 2, 1985, applicant has disclosed an Infinite Speed Variation, Constant Power, Ripple-Free Transmission. The disclosed transmission uses a multi-lobed cam, rotatably mounted on a shaft. Followers, positioned to engage the cams, transmit the rotation of the cams to another shaft through use of one-way clutches.

While the gearing systems and transmissions described in the foregoing devices have proven desirable for use, it has been found that such devices do not always permit easy, smooth shifting to allow for effective selection of the infinite gear ratios available with the devices.

SUMMARY OF THE INVENTION

The instant invention provides a generally inexpensive, reliable, and infinitely variable, easily and smoothly shifted transmission or torque-multiplying speed-changing device system.

To provide constant power, speed changing and torque multiplication, the invention utilizes a variable throw cam and cam follower system to provide ripple-free output speeds and wide ranging torques. One end of the cam lobe has zero throw. The opposite end of the cam lobe has maximum throw. There are an indefinite number of different throws between these extremes.

A unique control means of the invention provides a smooth, easy shifting of cams under the cam followers and under load of a type described herein. In one embodiment of the invention, the followers are mechanically associated with the cam surfaces by a structural member which provides a steerable anti-friction rolling action of the followers over the cam surfaces, while the cam is longitudinally displaced under the axially fixed follower(s) and while the cam turns under the follower(s). Alternatively, the cam may be axially fixed and the followers slidably splined onto the input shaft so that they can be slidably displaced. In this alternative embodiment, a similar structural member provides a steerable, anti-friction rolling action association of the cam followers vis-a-vis the cam. The control means provide even minute displacement of the cams longitudinally beneath the followers.

The invention provides an automatically controlled transmission suitable for varying the propeller speed of a wind turbine (the propeller being the prime mover). The invention may also be used to provide an optimum propeller speed for each wind speed, to selectively stall the propeller by slowing it down in higher wind speeds. This permits maximum generator output to be maintained but not exceeded at these higher speeds, thereby increasing the energy output of wind turbines.

The invention also provides an easily and smoothly shifted transmission suitable for use with a bicycle that, because of its wide ratio range and high efficiency, will allow a bicycle rider to travel further and faster while using a minimum amount of energy.

Additionally, the invention provides a smoothly shifted industrial speed changer that can, while being driven by a low cost, efficient, electrical motor, efficiently provide a wide variety of output speeds, with output torque increasing while output speeds decrease.

The invention provides a smoothly shifted vehicular transmission that can, because of its wide ratio range, greatly improve fuel economy and acceleration for cars, trucks, buses, trains, tractors and planes.

Additionally, the invention provides a large family of low cost, efficient, fixed ratio industrial speed changers whose fixed ratios can be changed if necessary. A multiple variety of these fixed ratio speed changers can be made from a few identical parts.

Structurally, the instant invention includes an input shaft journaled in a retaining housing. A lobed cam is splined on the input shaft and adapted for sliding displacement along a length of that shaft. One or more cam followers are pivotedly mounted and axially constrained to the retaining housing or, alternatively, to an output shaft journaled in the retaining housing and held in a spaced relationship with the cam. Various orientational arrangements of the cam followers relative to the cam are within contemplation. For example, some embodiments position the cam followers linearly in tandem along the length of the cam. Other embodiments, for example, utilizing two, three, four or more cam followers, position the cam followers in a generally spaced circular arrangement about a centrally positioned cam. In an embodiment having multiple output shafts, cam followers associated with a common output shaft may be arranged in tandem. The groups of tandemly arranged cam followers, each group having its respective output shaft, are positioned about a centrally positioned cam, e.g., in a generally spaced circular arrangement.

In this alternative embodiment, the cam is axially fixed to the input shaft. Whereas in the first embodiment the cam is displaced relative to axially fixed cam followers, in this alternative embodiment the cam followers are displaced relative to an axially fixed cam.

Alternatively, one or more cam followers are splined on the output shaft and adapted for sliding displacement along a length of that shaft. Each cam follower is urged into a mechanical engagement against the cam by a biasing means. Various types of biasing means are contemplated within the scope of the invention. Of those disclosed, one such means relies on the mechanical characteristics of compressed springs; a second biasing means utilizes an arrangement of hydraulically actuated, piston-fitted cylinders oriented to direct a force against each of the respective cam followers, thereby urging those followers into a mechanical engagement with the cam.

Each cam follower is fitted with a cam contact member (hereinbefore described as a structural member) which may be a rotatably mounted wheel or anti-friction roller which is positionable to engage and ride upon the cam. The contact member may be mounted to be steerable, i.e., the wheel's orientation, i.e., its axis of rotation, relative to the structure of the cam follower may be altered. This steerability permits the cant or orientation of the roller, relative to the cam surface on which it rides, to be changed. A given alteration to the orientation of the wheel's axis of rotation induces longitudinal, axially directed forces on both cam follower and the cam itself. In those embodiments having a displaceable cam, these forces effect a displacement of the cam along the input shaft relative to the follower(s). In those embodiments having displaceable followers, the followers are displaced by the force. In both embodiments, the fixedly-mounted cam follower or cam remains axially stationary. The resulting displacement of the cam in the first embodiment or the cam followers in the second embodiment effects a change in the throw of the cam follower(s) as the rotating cam is passed beneath the cam follower(s) during the cam's displacement. The rim of the follower wheel never slides on the cam while speed ratios are changed.

The invention discloses a steering means for controlling or alternatively, maintaining the contact member's orientation. This steering means may be actuatable externally from the transmission itself.

Furthermore, the invention may include a control system which includes a feedback mechanism for interrelating the steering means with the actual position of the cam at any given time. After the cam follower contact member has been steered and the cam is thereby forcedly displaced to a desired location, the feedback mechanism operates to reorient the cam follower contact member to an equilibrium orientation, thereby reducing and eliminating any axially directed force application to the cam by the contact member at the selected ratio.

The cam followers mechanically engage an output or reaction shaft by means of one or more one-way clutches. Although various types of such clutches may be utilized in the invention, e.g. sprag or roller type one-way clutches, the invention may further include my unique hydraulic one-way clutch. This hydraulic one-way clutch includes a rotor which is fixedly mounted on an output shaft. The rotor is rotatably mounted within the hollow cavity of a ring housing which, in turn, may be the hub of a respective cam follower. The rotor is spacedly positioned from the interior wall of the ring housing, which housing defines an oblate cavity therein. A plurality of extendible vanes are biasedly mounted within channels recessed into the structure of the rotor. An auxiliary channel communicates with each recess channel as well as the innermost part of each vane. Each auxiliary channel furthermore communicates with the exterior of the rotor between each pair of vanes. The auxiliary channels are adapted to selectively receive pressurized fluid and direct that fluid against the innermost part of the respective vanes and thereby forcefully displace those vanes from within their respective recess channels outward toward the ring housing, cavity-defining interior wall.

The vanes are adapted to abut against the interior wall and thereby subdivide the space extant between the rotor and the interior wall into a plurality of wedge-shaped cross-sectioned subchannels. Upon a rotation of the rotor in a first direction, the configuration of the annular channel and the plurality of subchannels creates a high oil pressure within a plurality of the subchannels as the rotor's rotation causes the spatial volume of some of those subchannels to decrease. The resulting hydraulic pressure creates essentially a hydraulic or pressure linkage of the rotor with the ring housing whereby a corresponding rotation of the rotor in the first direction causes a rotation of the ring housing in the same direction or vice versa. The outmost parts of the vanes are configured so as not to include surface areas on which an imposition of directed forces, by the described hydraulic pressures, would induce a return of the vanes back into their respective recess channels within the rotor. When the rotor is rotated in the opposite direction, the ends of the vanes, due to their configuration, provide a surface on which the increasing oil pressure can act, there-by pushing the vanes into the rotor, and dismantling the subchannels and eliminating the linkage between the rotor and ring housing. This occurs since there is no auxiliary channel from the other side of the vane to allow oil pressure in under that vane. Absent the linkage, the rotor turns freely in the ring housing cavity with no related rotation of the ring housing. Note that the ring housing cavity is kept filled with oil through make-up passages leading from a lower pressure oil supply source. The oil is filtered during operation by a filter between the high pressure and low pressure areas of the clutch. A check valve precludes oil from flowing out of the high pressure area while permitting flow through the filter into that area.

It should be clear that the rotor could be the driving member and the housing the driven member of this clutch, or vice versa.

Previous cam and cam follower variable transmissions have varied the speed and/or torque of an output shaft by applying heavy displacing forces directly on the cam, thereby displacing it along the length of the input shaft. The instant invention effects such a cam displacement by reorienting the cant of the cam follower contact member. The rolling action of the cam follower on the cam induces an axially directed force on the cam which displaces the cam longitudinally along its support shaft and relative to the cam follower. In a first embodiment, the followers remains longitudinally fixed relative to the cam throughout the transmission's operation. In a second embodiment, the cam followers are made longitudinally displaceable by the reorientation of the contact member while the cam is longitudinally fixed.

Two embodiments of a control screw having a feedback means associated therewith adapted for interrelating the orientation of the cam follower contact member and the cam are disclosed. One construction utilizes a pivoted feedback linkage which mechanically relates the cam with a nut mounted on the control screw. A given displacement of the cam operates to induce a measured displacement of the control screw. A second control embodiment makes use of a hydraulic flow valve to control hydraulic pressure to a piston-fitted cylinder to interrelate cam displacements with a follower contact member reorientation.

THE DRAWINGS

Figure 1:
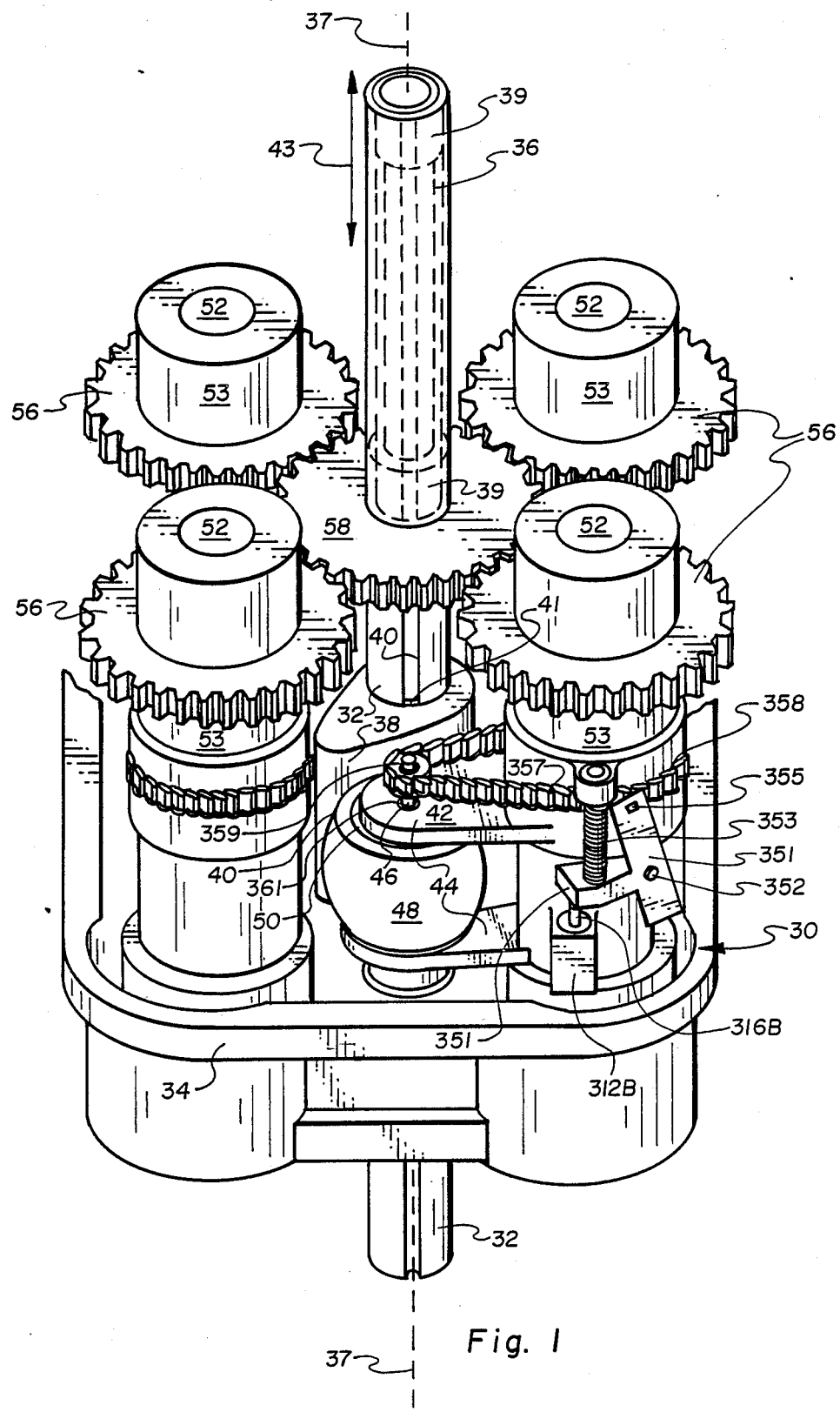
FIG. 1 is an elevated view of an infinitely variable transmission of this invention having four cam followers.
Figure 4:
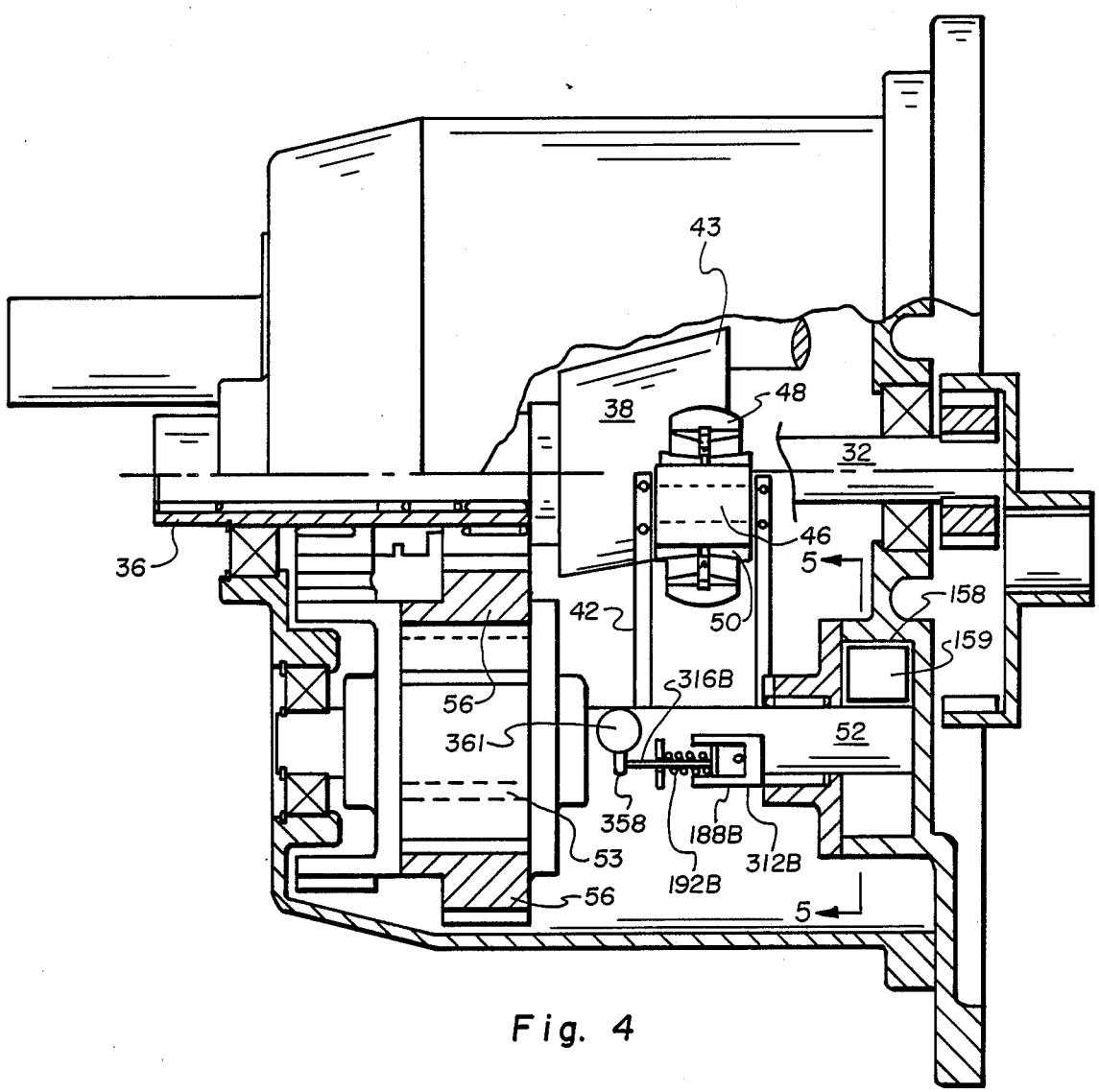
FIG. 4 is a side elevational view, partly in cross-section, of a second embodiment of the transmission having three cam followers.
Figure 5:
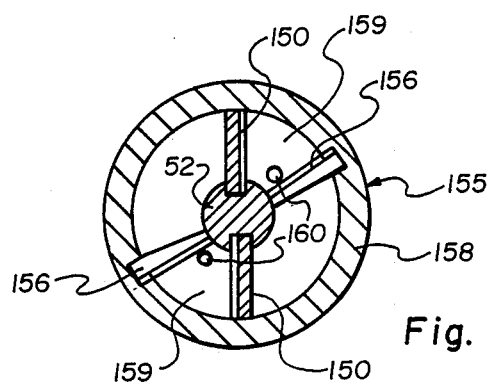
Figure 6:
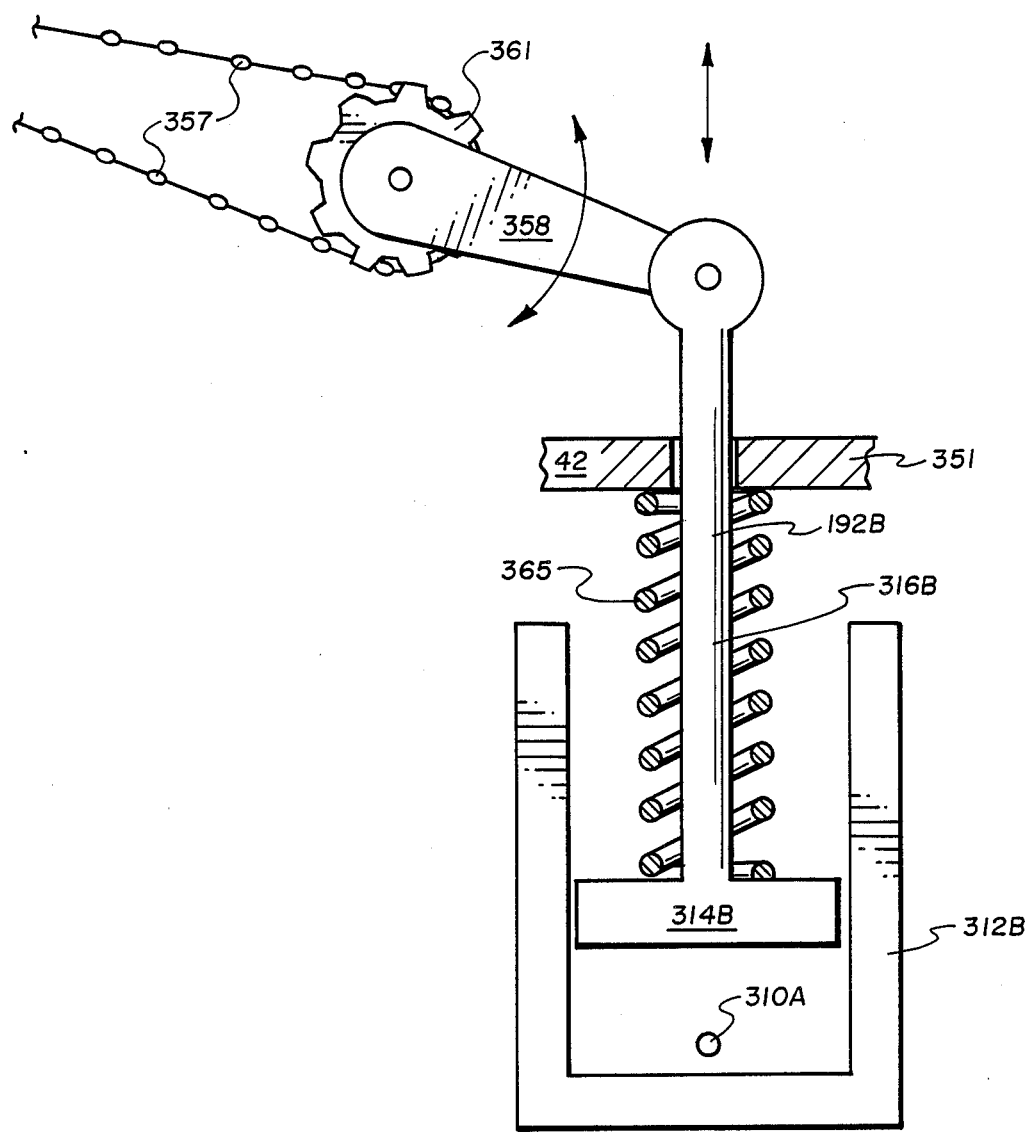
Figure 7:
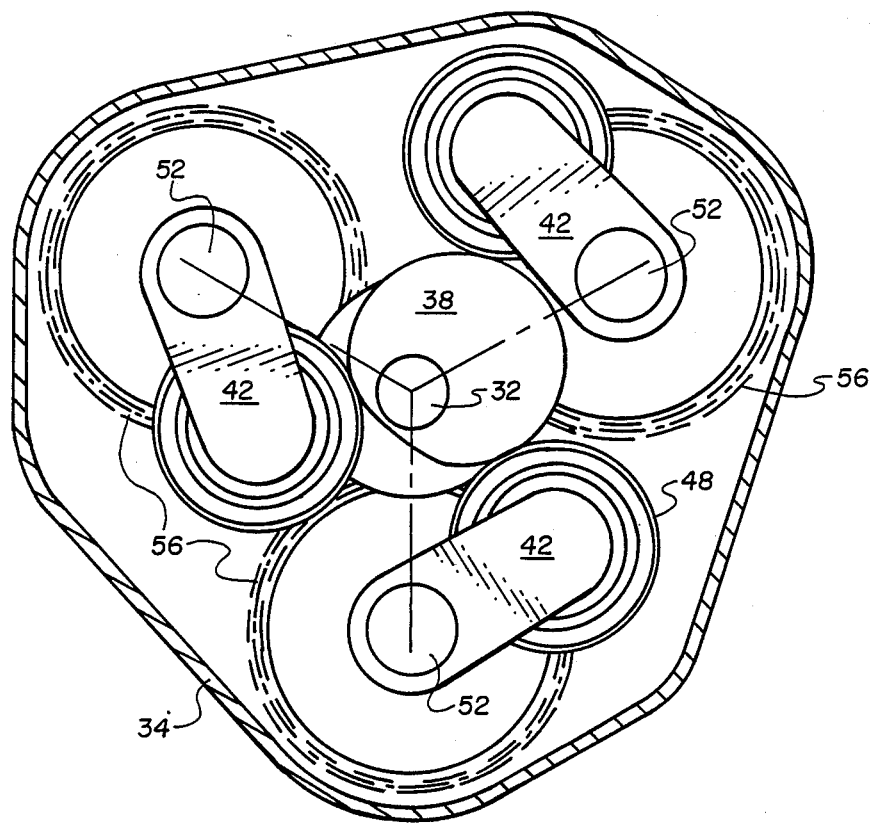
Figure 8:
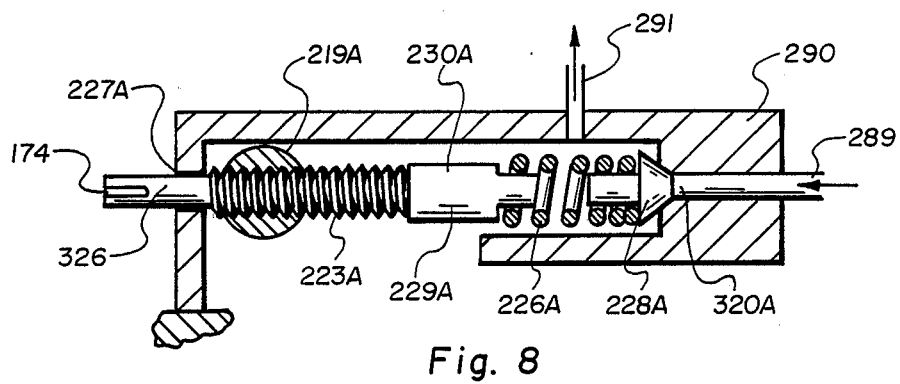
Figure 9:
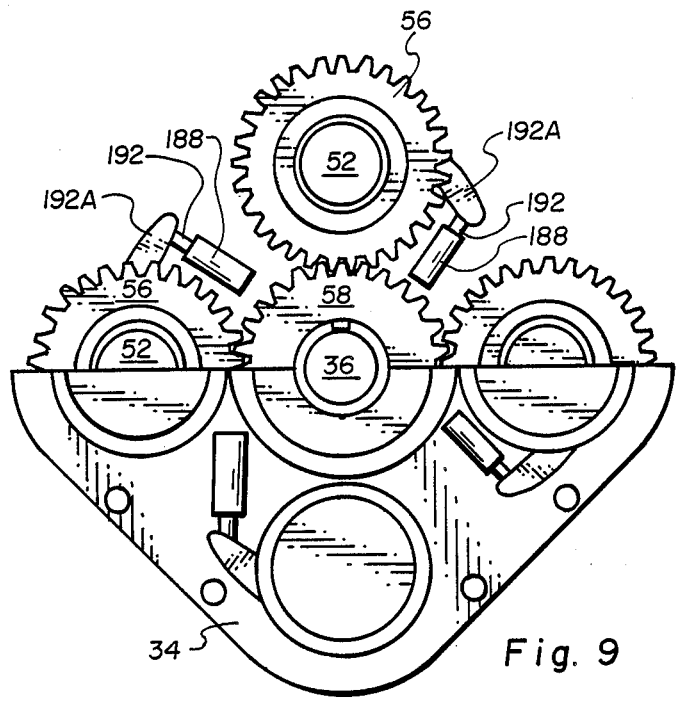
Figure 10A:
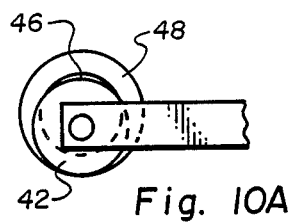
Figure 10:
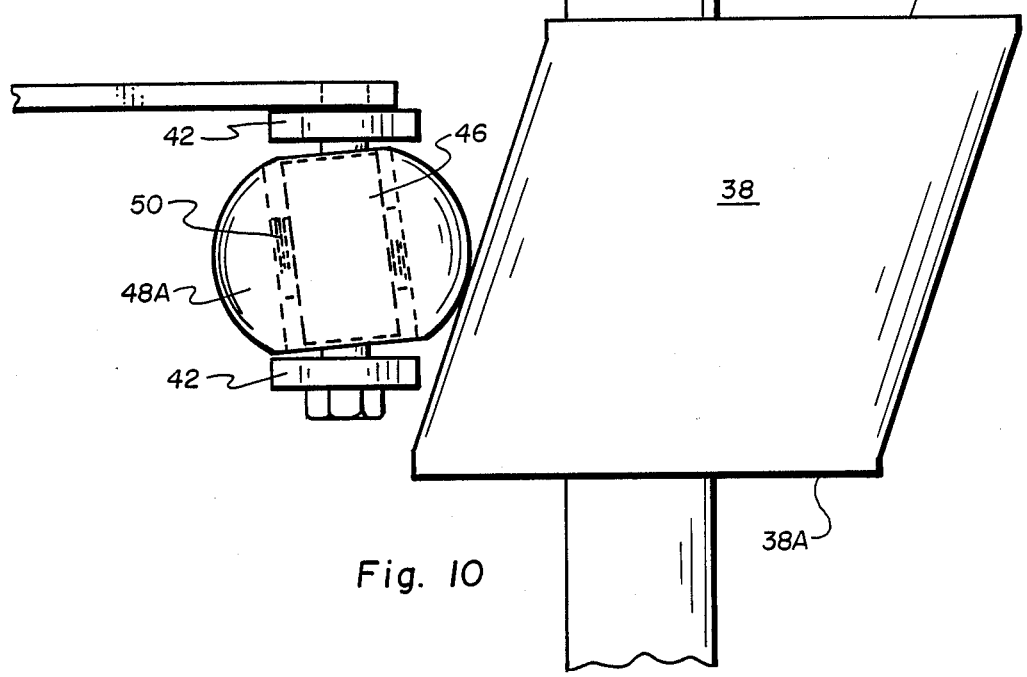
Figure 11:
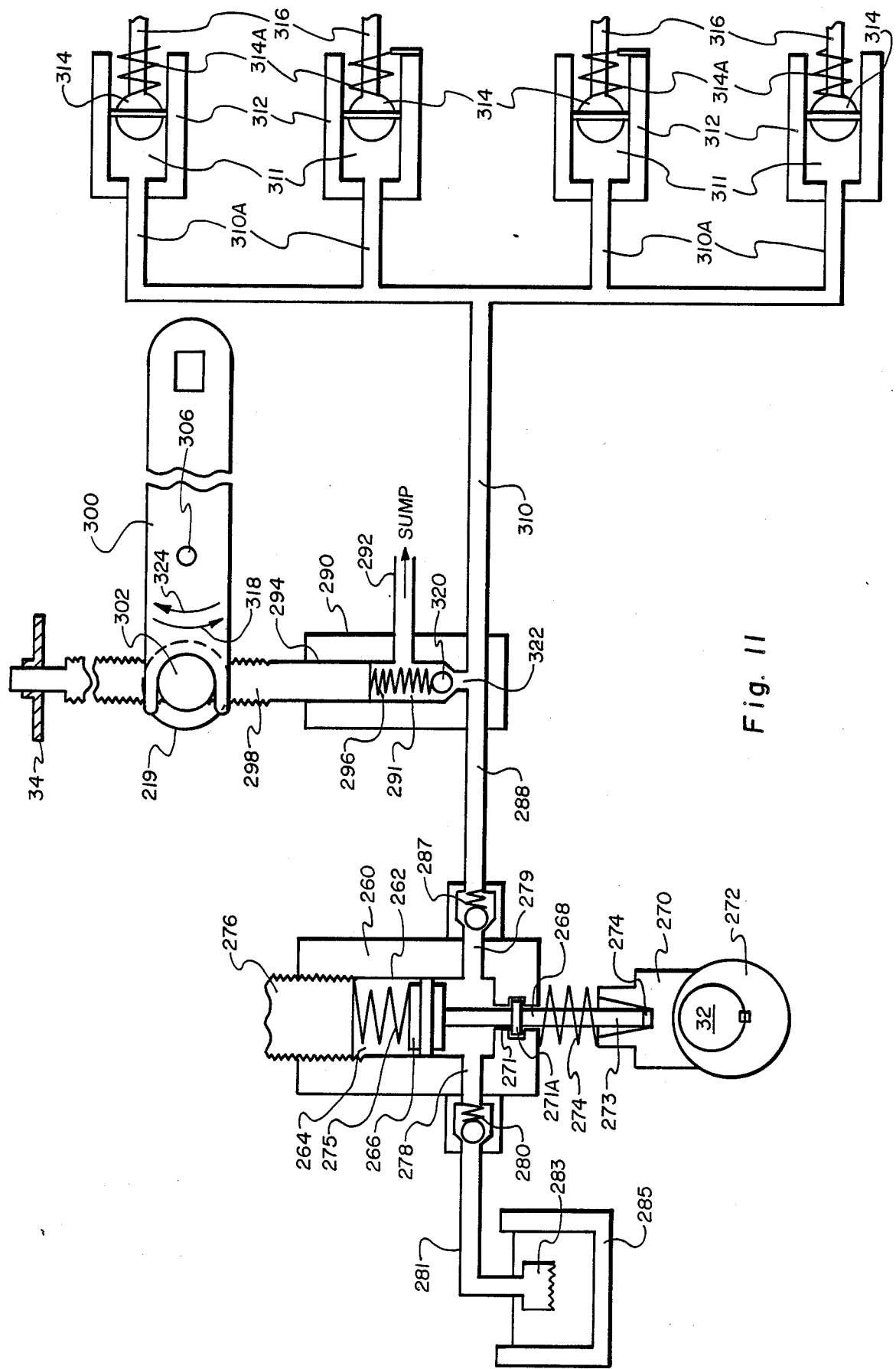
Figure 12:
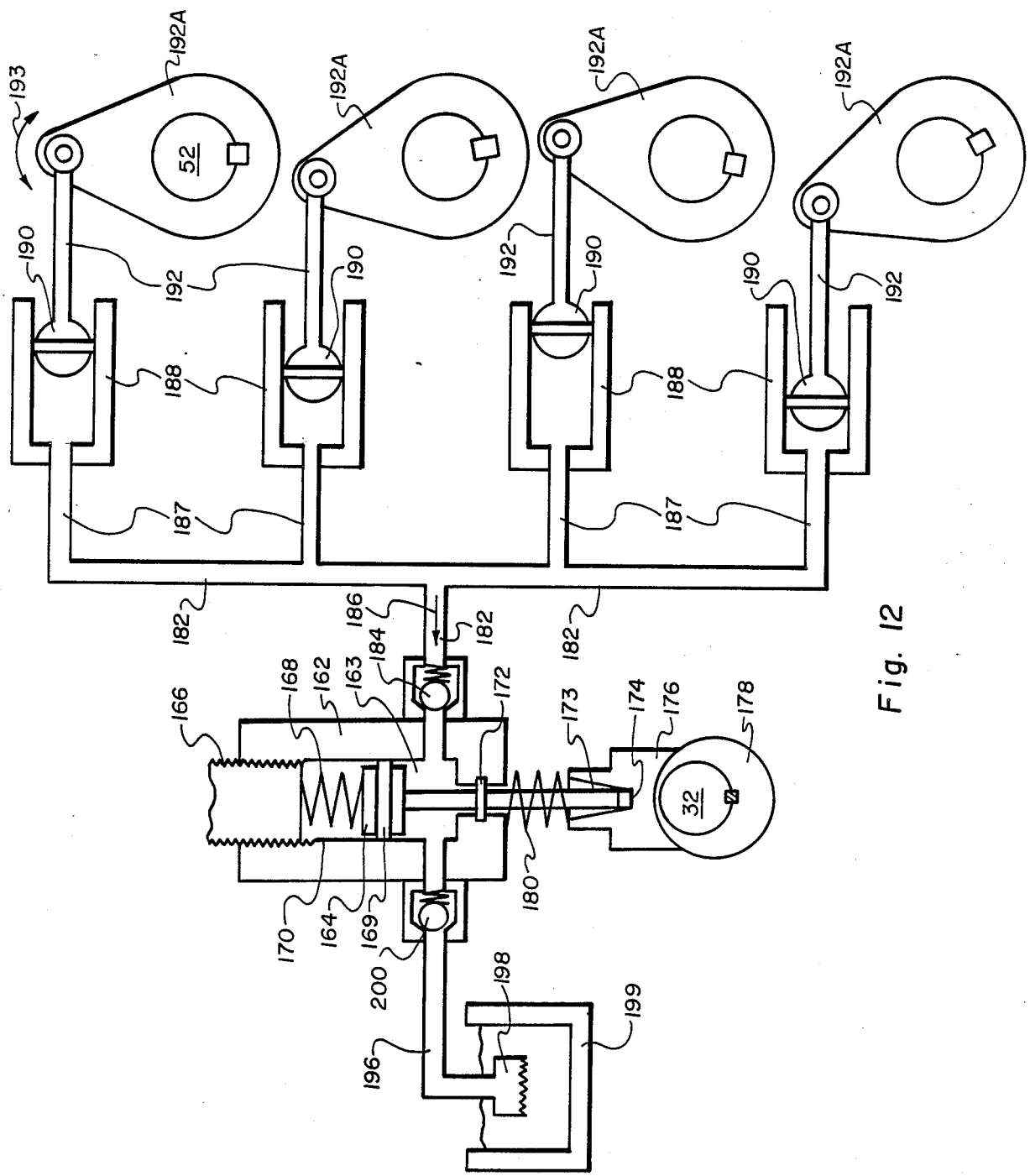
Figure 13:
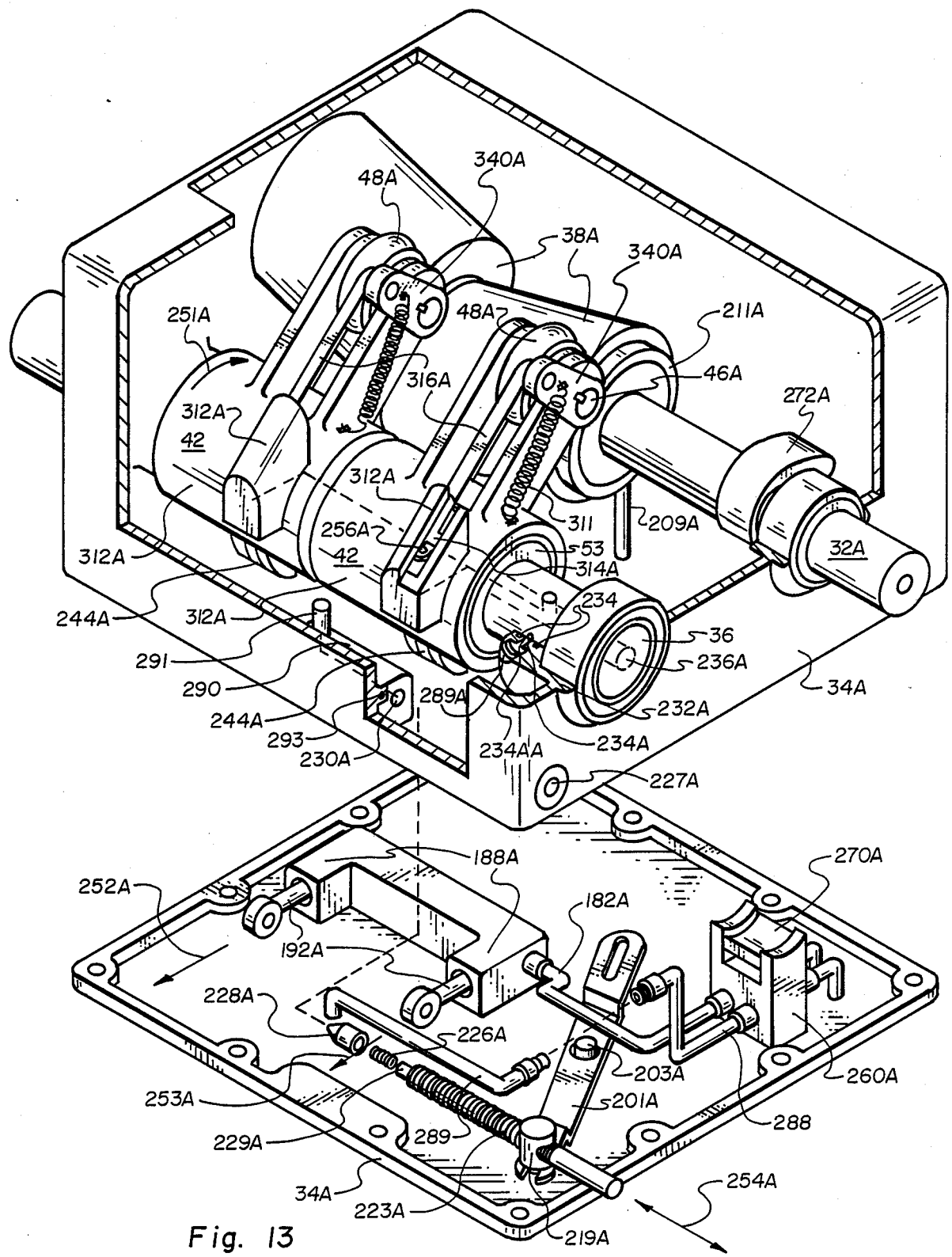
Figure 14:
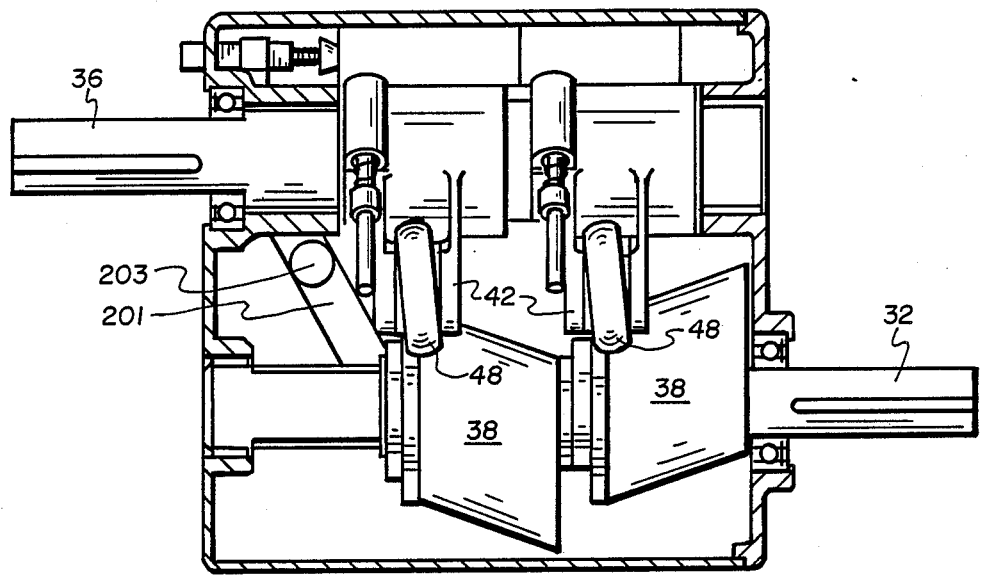
Figure 15:
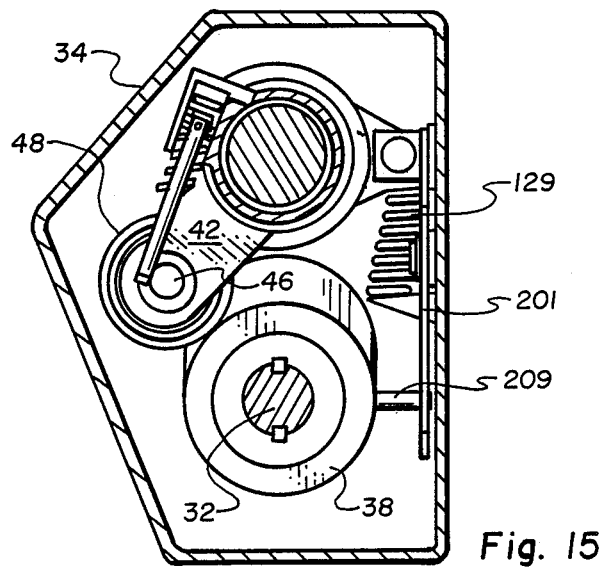
Figure 16:
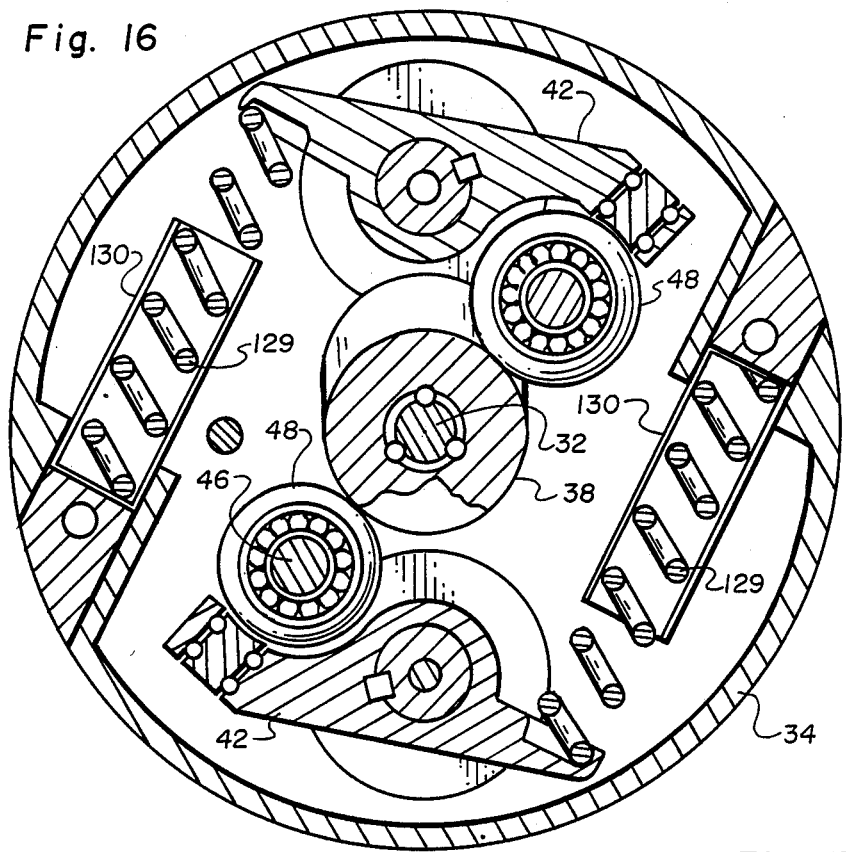
Figure 17:
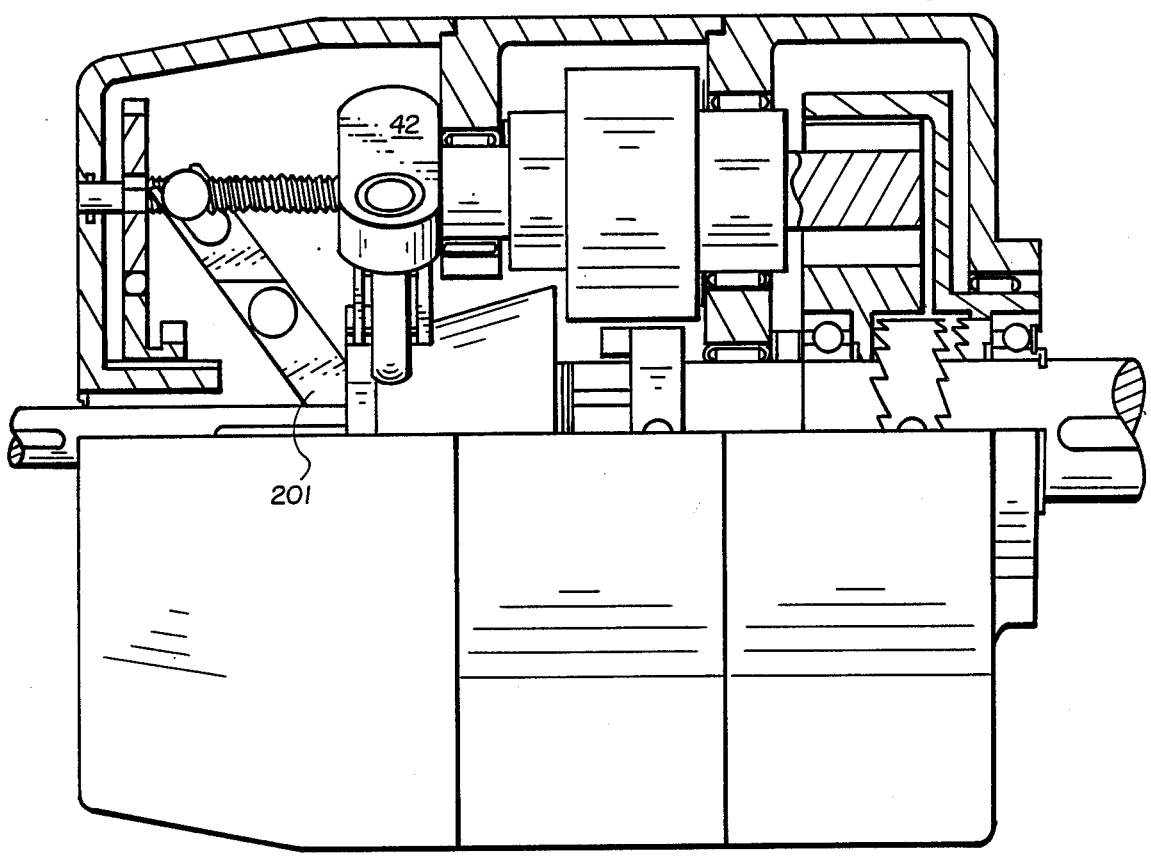
Figure 18:
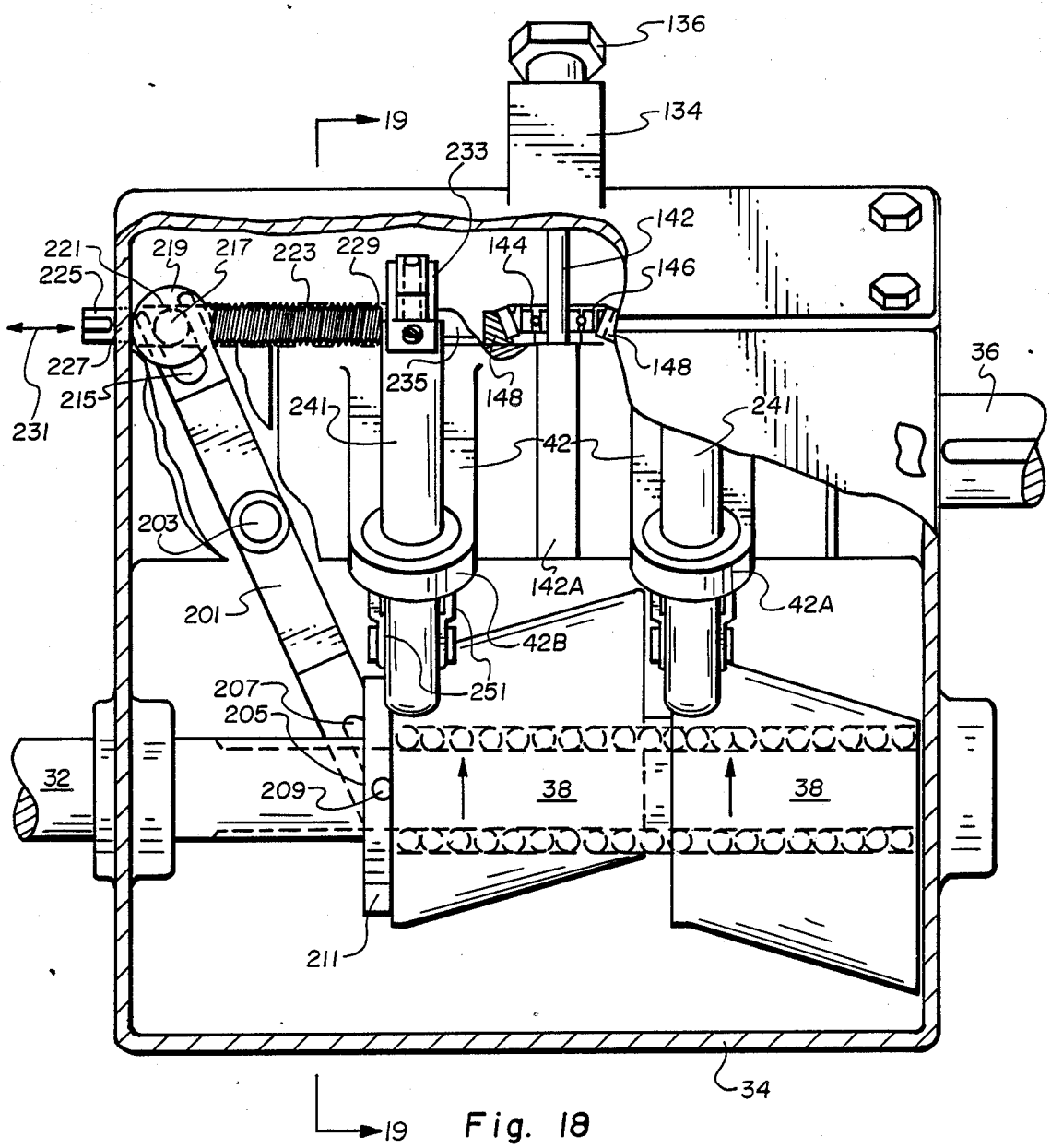
Figure 19:
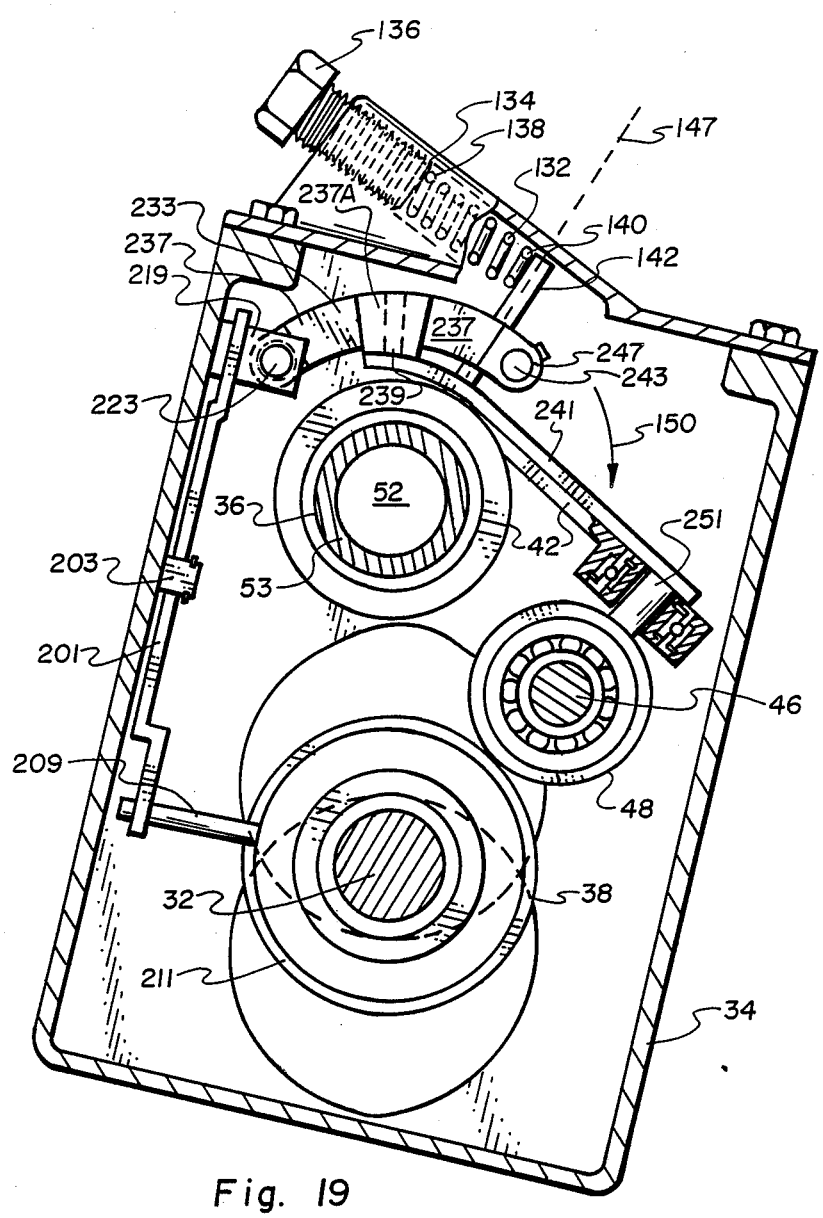
Figure 20:
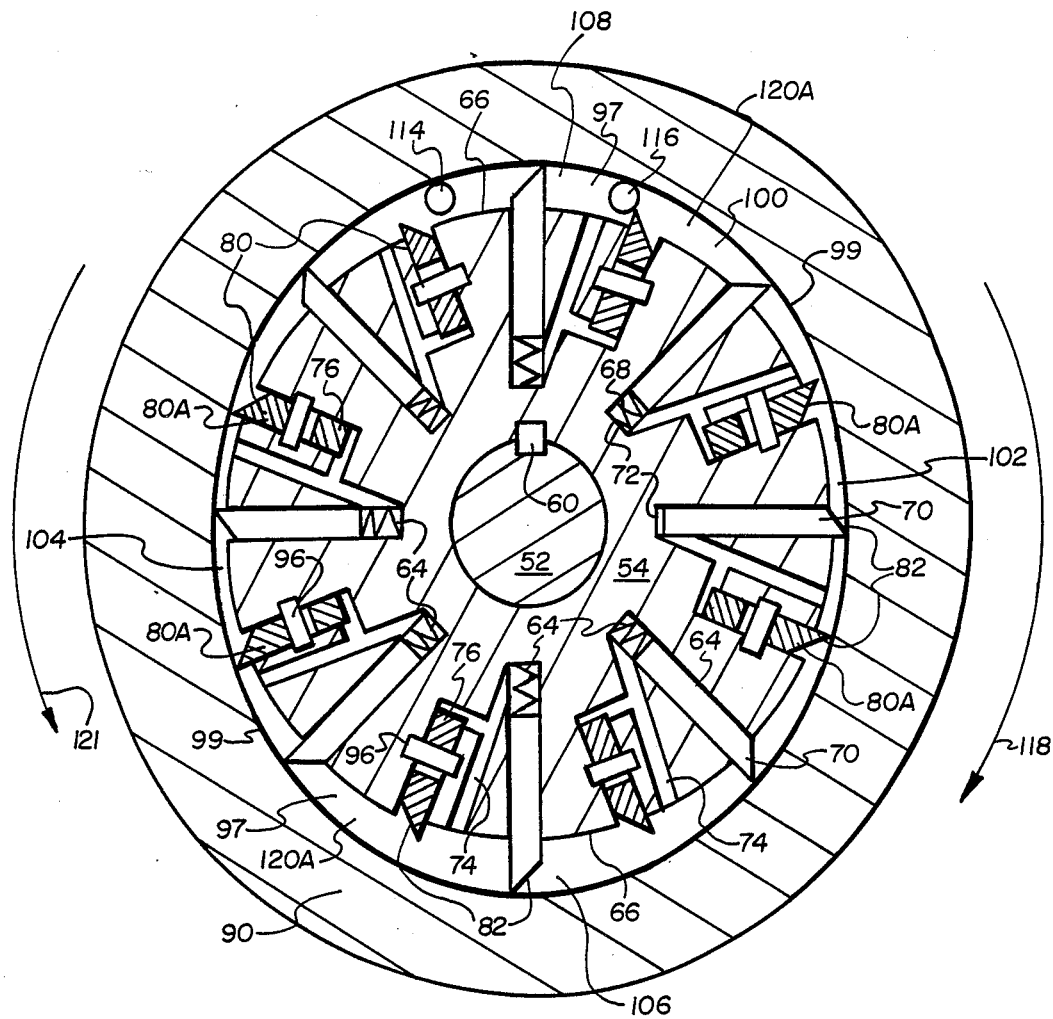
Figure 21:
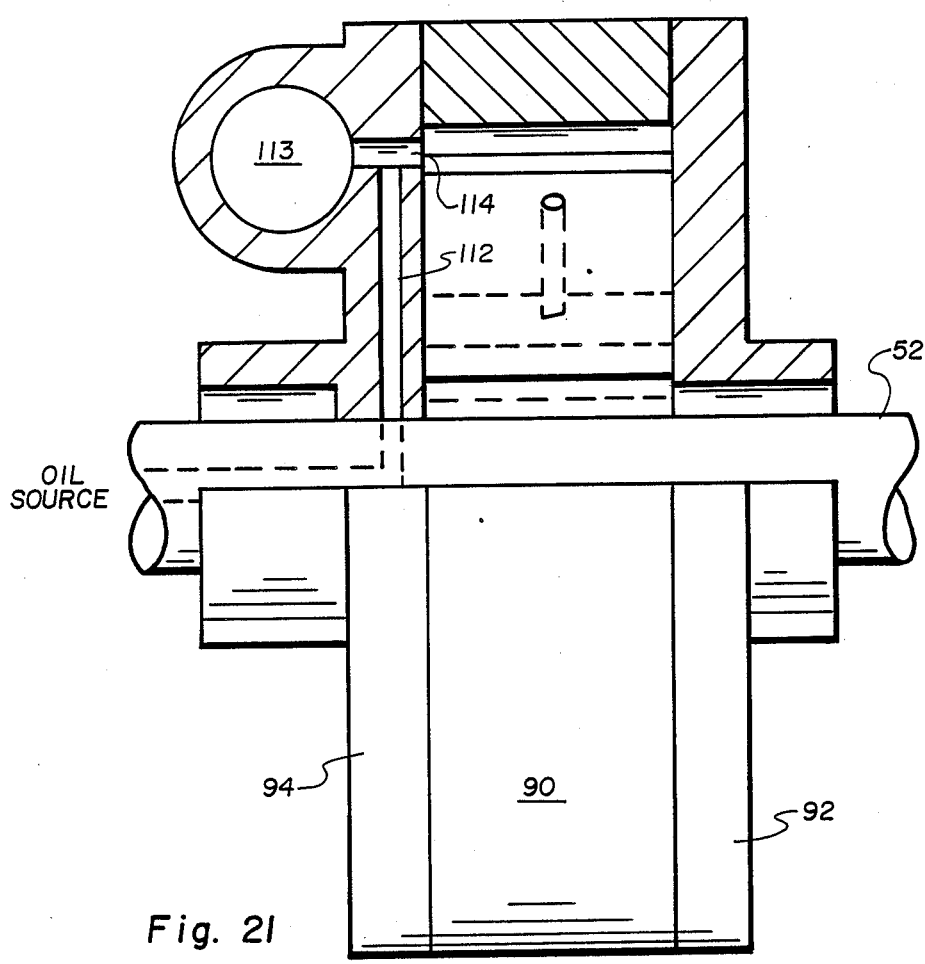
Figure 22:
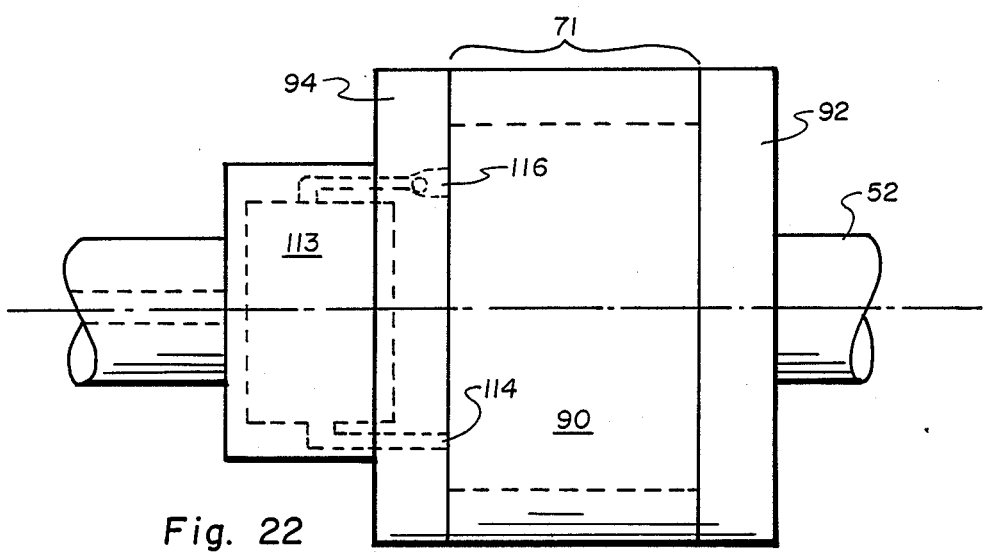
Figure 23:
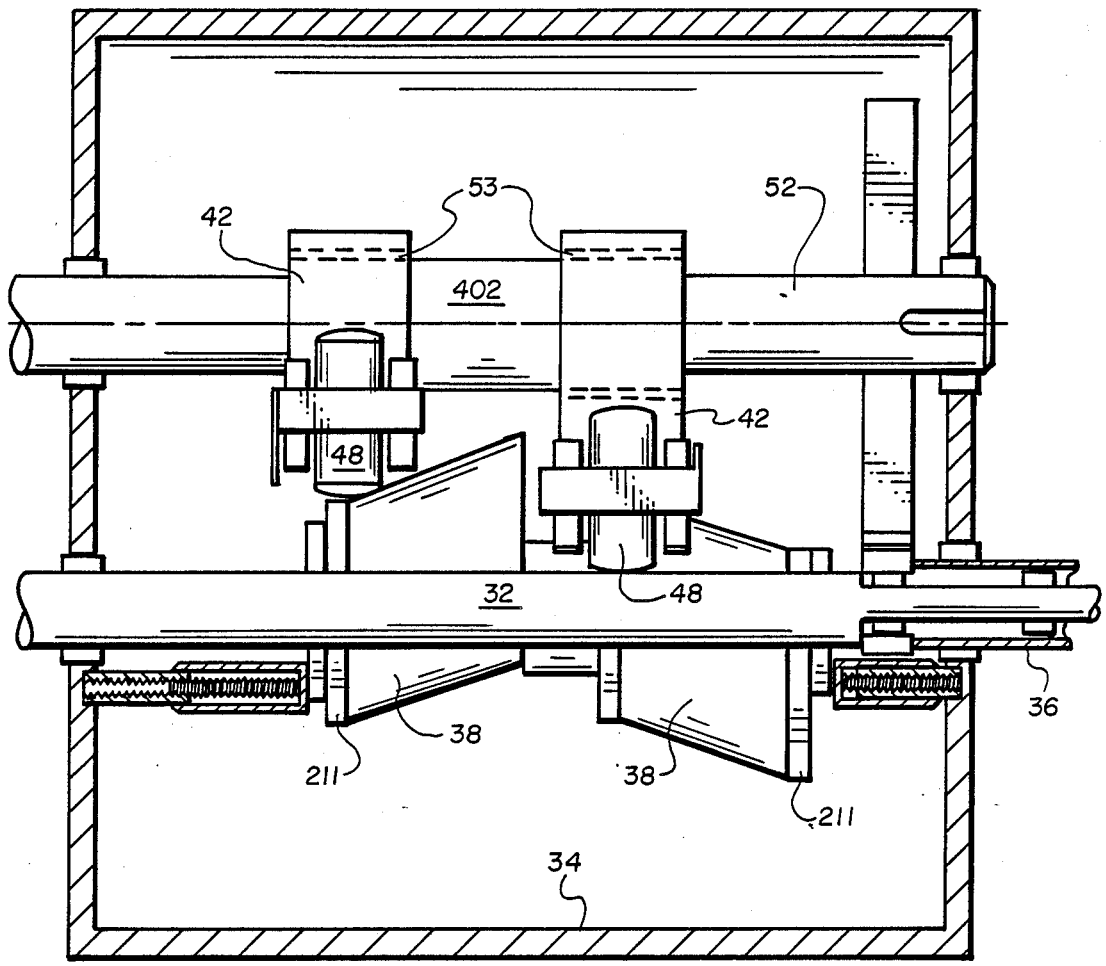
Figure 23A:
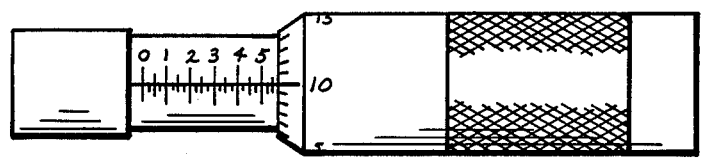
Figure 24:
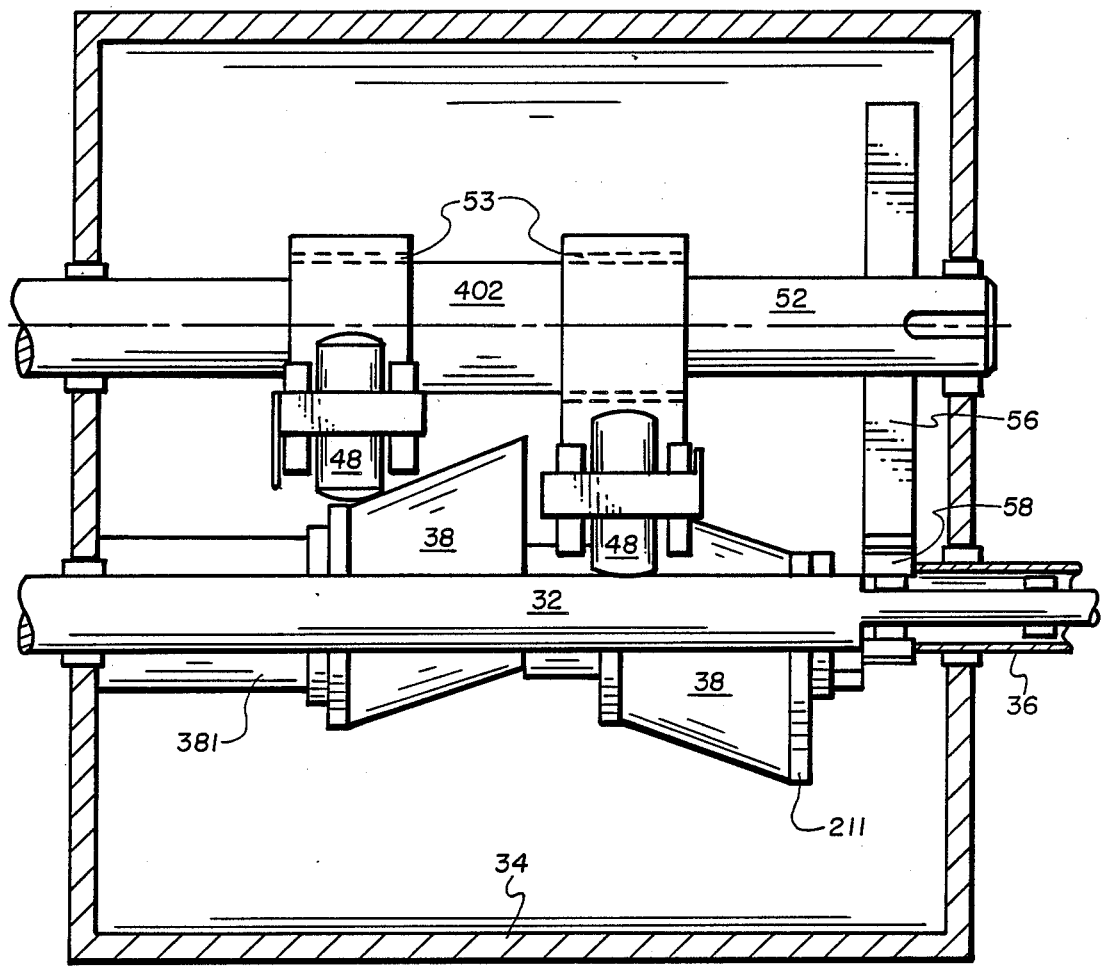
Figure 25:
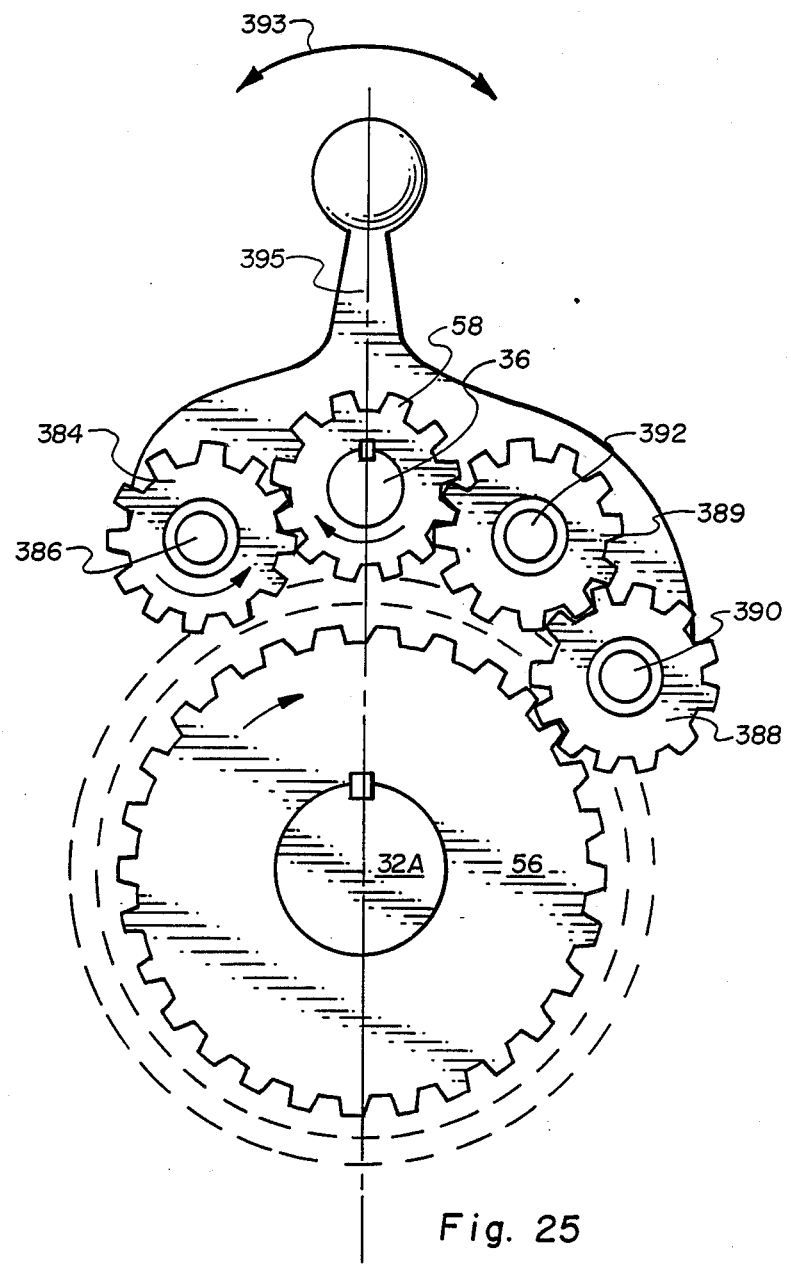
Figure 26:
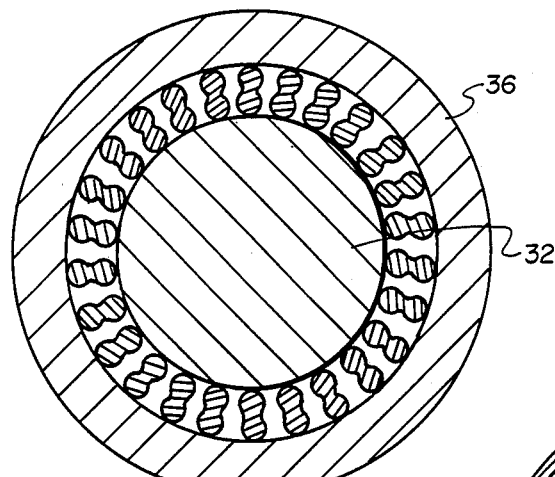
Figure 27:
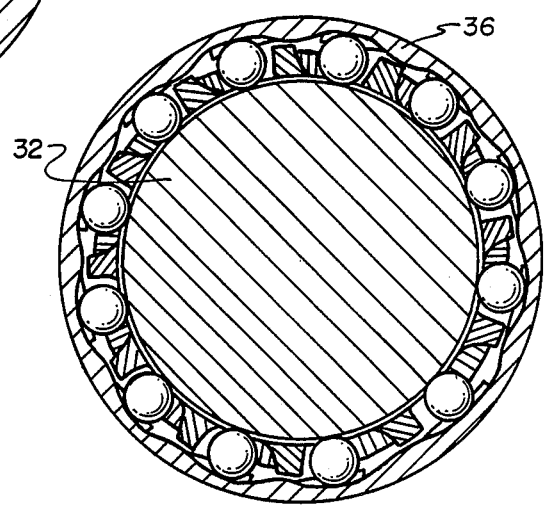
Figure 28:
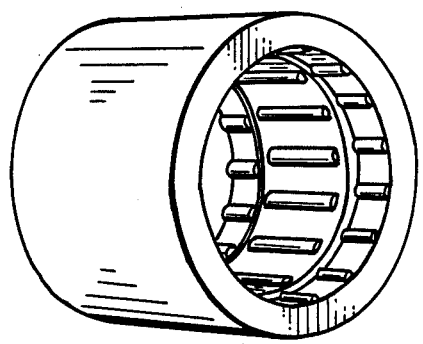
Figure 29:
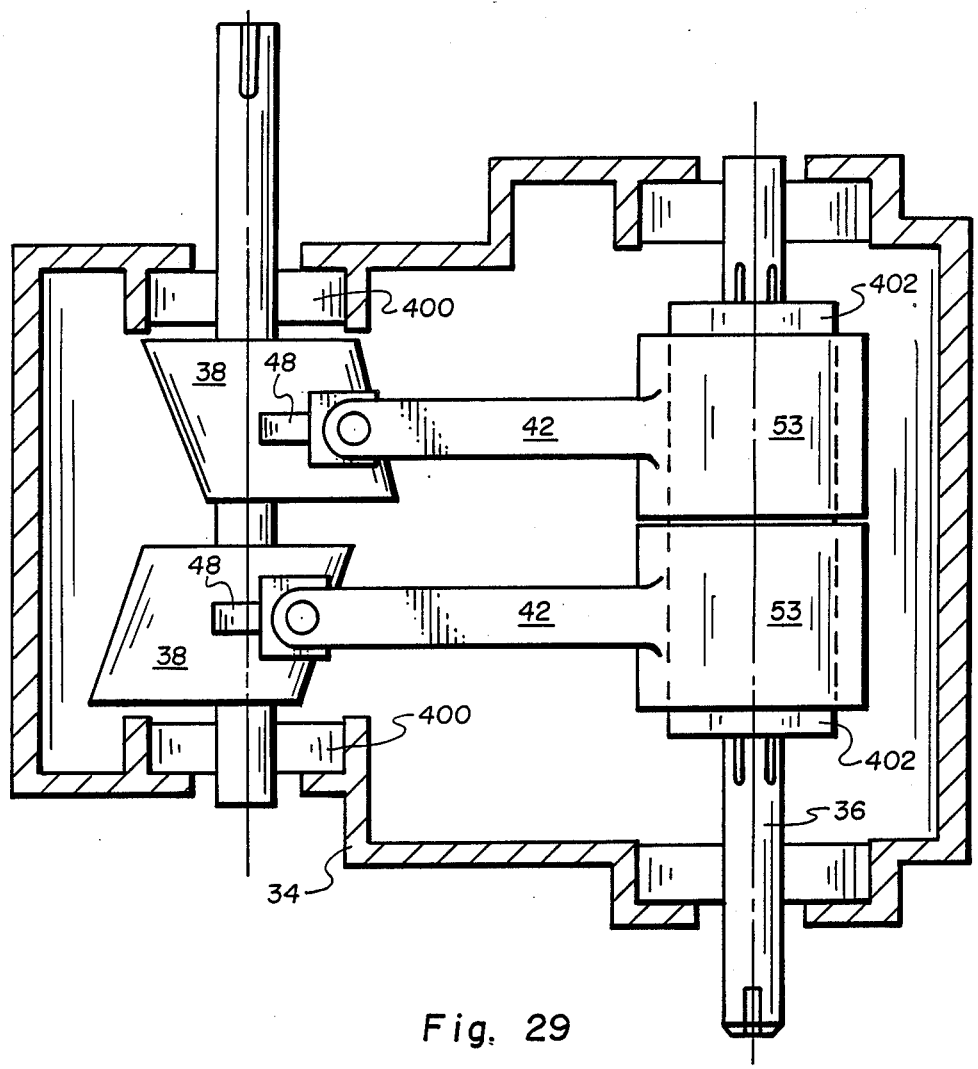
Figure 30:
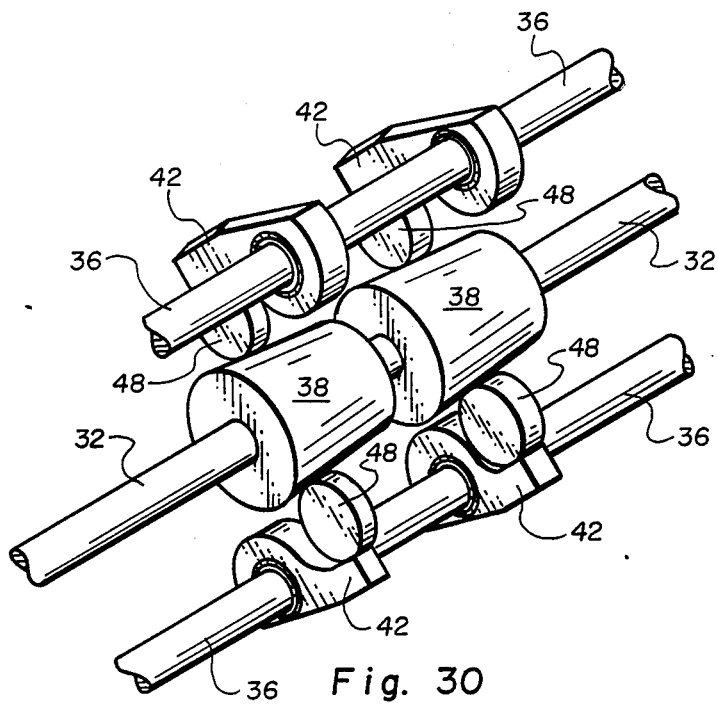
Figure 31:
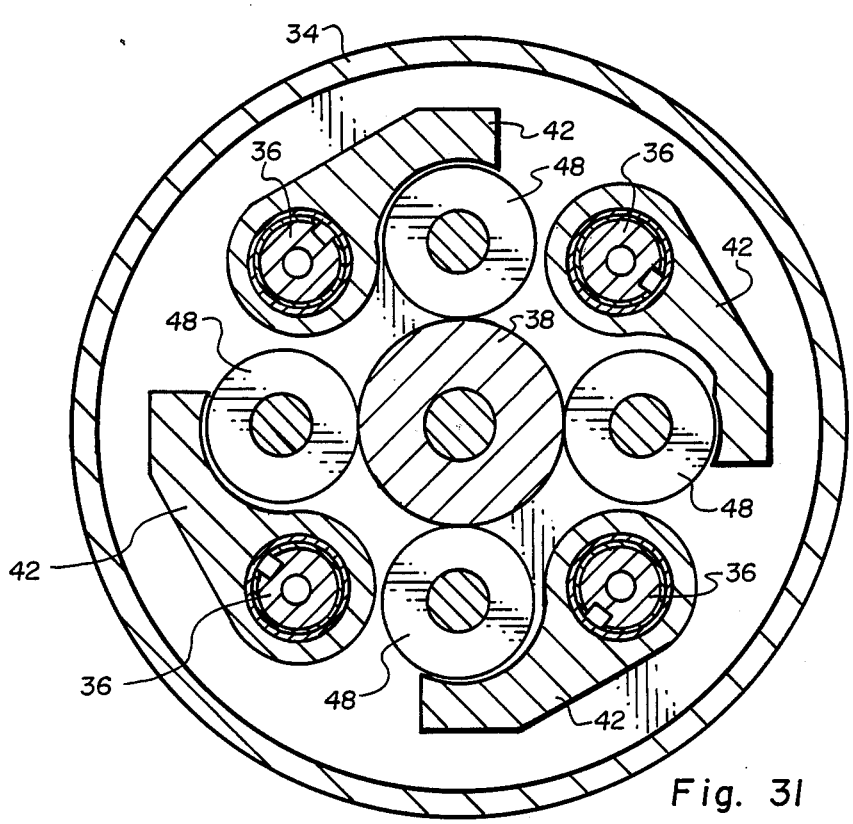
Figure 32:
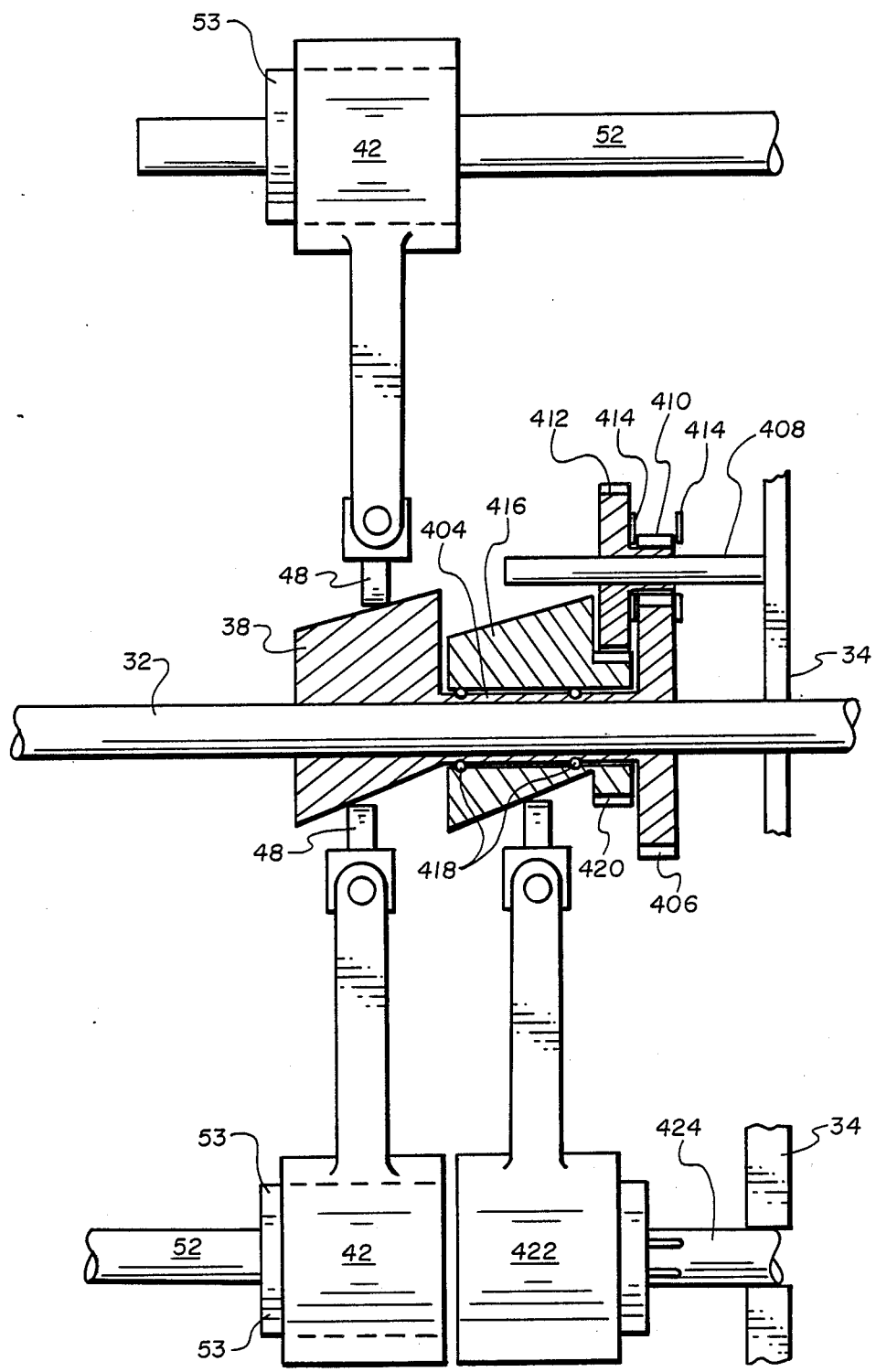
Figure 33:
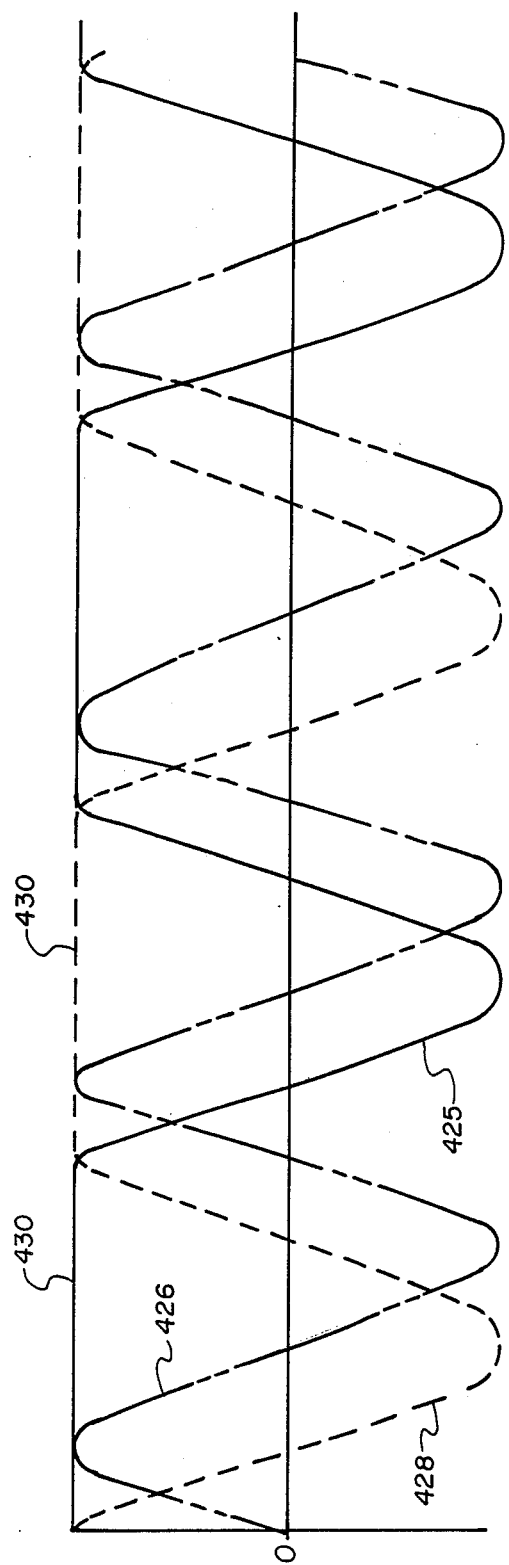

FIG. 5 a cross-sectional view of the hydraulic spring used in the transmission shown in FIG. 4 taken along sectional lines 5—5;

FIG. 6 is a cross-sectional side view of a hydraulically act control means of the invention;

FIG. 7 a top view of the transmission shown in FIG. 4;

FIG. 8 is a cross-sectional view of a control valve of the invention;

FIG. 9 a top view, partly in cross-section, of the transmission shown in FIG. 1 wherein the cam followers have been removed or clarity purposes;

FIG. 10 is a side view of a cam in association with a steerable cam follower wheel;

FIG. 10A is a top view of a cam follower roller arrangement shown in FIG. 10;

FIG. 11 is a schematic view of the cam follower controls of the transmission shown in FIG. 1;

FIG. 12 is a schematic view of the cam follower biasing means of transmission shown in FIG. 1;

FIG. 13 is an elevated exploded perspective view of a two-cam follower embodiment of the transmission of this invention;

FIG. 14 is a top view of the transmission shown in FIG. 13;

FIG. 15 is an end view of the transmission shown in FIG. 13 illustrating an alternative biasing means;

FIG. 16 is a cross-sectional view of an alternative embodiment having two-cam followers of the instant transmission invention;

FIG. 17 is a side view, partly in cross-section, of the transmission shown in FIG. 16;

FIG. 18 is a side elevational view, partly in cross-section, of second embodiment of a two-cam follower transmission of the instant invention;

FIG. 19 is a side view of the transmission illustrated in FIG. 18 taken along sectional lines 19—19;

FIG. 20 is a cross-sectional view of a one-way hydraulic clutch of the invention;

FIG. 21 is a side view of the hydraulic clutch of FIG. 20;

FIG. 22 is a top view of the hydraulic clutch shown in FIG. 21;

FIG. 23 is a cross-sectional view of a transmission of the invention adapted for a constant ratio drive;

FIG. 23A is a side view of a micrometer-type cam positioner;

FIG. 24 is a cross-sectional view of a transmission of the invention adapted for a constant ratio drive;

FIG. 25 is an end view of a forward-reverse drive shift mechanism;

FIG. 26 is a perspective view of a roller-type bearing configured as a one-way clutch;

FIG. 27 is a cross-sectional view of the clutch shown in FIG. 26 along section lines 27—27;

FIG. 28 is a cross-sectional view of a sprag one-way clutch usable in the instant invention;

FIG. 29 is a top view of an alternative embodiment of the invention wherein the cam followers as opposed to the cam is rendered slidably displaceable along its support shaft;

FIG. 30 is an elevated perspective view of the transmission shown previously cross-sectionally in FIG. 16;

FIG. 31 is a cross-sectional view of a modified embodiment of the shown in FIG. 30;

FIG. 32 is a cross-sectional side view of a transmission having a damper cam follower associated therewith;

FIG. 33 is a graph of the angular velocities of the two-cam follower transmission fitted with a damper cam follower.

DETAILED DESCRIPTION OF THE INVENTION

The infinitely variable transmission of the invention, as shown in FIG. 1, includes an elongate cylindrical input shaft 32 which is journaled in a housing 34 and output shaft 36. The hollow, elongate cylindrical output shaft 36 is co-axially journaled on the input shaft 32. The shafts 32 and 36 being journaled in housing 34 are mounted to be rotatable differently from one another whereby the input shaft 33 may be rotated about a longitudinal axis 37 at a speed and torque different than the speed and torque of the rotating output shaft 36. In a preferred embodiment, the output shaft is mounted by means of bearings 39 on the input shaft 32 whereby the input shaft 32 forms a support for the output shaft 36 while not limiting the rotation of that output shaft 36.

The input shaft 32 includes splines 40. A cam 38 has matching splines 41 to slidably engage and slide on the splines 40 of shaft 32. The cam 38 is mounted on input shaft 32 to be axially displaceable along a length of input shaft 32. Cam 38 is configured to have one lobe which intercooperates with a plurality of cam followers 42 fixed to shafts 52 which are radially arranged about the input shaft 32 and journaled in housing 34. When viewed from its end, the contour of the cam 38 is designed to include a first end 38A and an oppositely positioned second end 38B as shown in FIG. 10. The first end 38A is dimensioned to provide no motion to a cam follower 42 riding on the rotating cam. When the cam followers 42 are positioned over end 38A, the transmission is essentially in zero output speed. As the cam 38 is displaced along input shaft 32 whereby the cam follower 42 which is axially fixed in place approaches the opposing cam end 38B, the follower 42 is subjected to an infinite number of increasing throws owing to the particular continuously increasing eccentricity of the cam 38. The cam 38 is configured to drive the cam follower 42 at a constant unrippled angular velocity during the driving part of its motion. End 38A may present a generally circular cross-section. End 38B in cross-section defines a lobe.

Cam follower 42 includes a bifurcated fork a configuration 44 having an axle 46 mounted to extend therebetween proximate the end of the forks. The axle 46 has a skewed shaft-like part and is rotatably mounted in bearings retained within the individual forks. A roller or wheel 48 with a rounded rim is mounted on an anti-friction bearing 50 which in turn is mounted on axle 46. A central aspect of the invention is rendering this wheel 48 steerable whereby the wheel may be oriented to exert a directioned force on the cam 38, thereby urging that cam in a selected direction along the length of input shaft 32. Furthermore, the steerability of the wheel provides for an easier movement of the cam 38 beneath the follower 42. The structure of the steering means will be discussed hereinafter.

Each cam follower 42 is fixedly mounted to its respective planet shaft 52, which is, as shown, an elongate cylindrical shaft oriented parallel to the input and output shafts 32 and 36. Each shaft 52 is rotatably journaled in housing 34 and engages a respective one-way clutch 53. The clutch 53 is in turn connected to a planetary gear 56 which is retained in meshing engagement with an output sun gear 58 which is fixedly mounted on output shaft 36.

In operation, rotational input at shaft 32 is transmitted through cam 38, rollers 48, cam followers 42, and one-way clutches 53, gears 56 and 58, to output shaft 36. The speed ratio between the input 32 and output 36 shafts is determined by the relative positions of the rollers 48 along the length of the cam 38.

ONE-WAY CLUTCHES

The transmission of this invention may employ one of any number of one-way-type clutch mechanisms. For example, a conventional sprag or a roller-type one-way clutch may be used. Acceptable embodiments of these types of clutches are illustrated in FIGS. 26-28. Bearings having these constructions are available from Formsbrad of Houston, Tex. and Torrington Bearings of Torrington, Conn.

Alternatively, the unique hydraulic ratchet clutch illustrated in FIGS. 20, 21 and 22 may be utilized. This clutch includes a rotor 54 which is non-rotationally mounted to planet shaft 52 by a splined engagement 60. Rotor 54 is a disc-shaped member having a plurality of radially directed recess channels 64 defined therein. Each channel 64 extends from the outer edge 66 of the rotor toward the center of the rotor. Positioned within each channel 64 is a spring-like biasing member 68, e.g., a coil spring, and a power vane 70. Each spring biasing member 68 is positioned in abutment with the end wall 72 of its respective channel 64 and also in abutment with the end of its respective power vane 70, thereby urging that vane radially outward. A respective secondary channel 74 is defined within the rotor 54 for each passageway 64. Each secondary passageway 74 communicates with the exterior of the rotor 54 on one end and further communicates with its respective channel 64 on its opposing end. A plurality of third channels 76 is also defined within the rotor 54, each third channel being associated with a respective channel 64. Each channel 76 communicates with a secondary channel 74. Mounted within each third channel 76 is a dam vane 80. Both power vanes 70 and dam vanes 80 are adapted to be slidable within their respective channels. The outmost end of each power vane 70 and dam vane 80 is configured to define an angulated face 82. As shown in FIG. 20, in each pair of vanes, i.e. a power vane 70 and its associated dam vane 80, the orientation of the angulated faces of the two vanes are oriented to face away from one another. The dam vanes 80 are restrained by pins 96 which limit the extent of their extension outward away from the circumference of the rotor 54. Vanes 70 and 80 are the same length 71 as rotor 54 and are dimensioned such that upon their abutment against the inner wall of the ring housing they form a fluid-tight seal between the rotor and the ring housing.

Rotor 54 is mounted within a hollow housing ring 90. The ring 90 is fixed to housing ends 92 and 94, which are journaled on planet shaft 52.

As shown to advantage in FIG. 20, the rotor 54 has a generally circular cross-section whereas the walls of the ring housing define a generally elliptically cross-sectioned opening or channel 97 in which the rotor is housed.

The rotor 54, in association with the interior wall of the ring housing, defines an annular-like channel 100 which circumscribes the circumference of the rotor 54. The channel 100 has a variable width (designated as the radial distance between the rotor and the interior wall), which is constant over the entire length of the channel. The width obtains a minimum dimension at locations 102 and 104. Locations 102 and 104 are positioned diametrically opposite one another. The width is maximized at locations 106 and 108 which likewise are positioned diametrically opposite one another. As illustrated in FIG. 20, locations 102, 106, 104 and 108 are generally spacedly positioned ninety degrees from one another, as one progresses through the channel in a clockwise direction. The channel width increases continuously between location 102 and location 108 as well as between location 102 and location 104. The same channel width configuration exists between location 104 and location 106 and between location 104 and location 108.

The dam vanes 80 are restrained by pins 96 from extending outward from the rotor much further than a distance equal to the width of the channel at locations 102 and 104, i.e. in an extended position a given dam vane only contacts the interior wall 99 when that dam vane is positioned at location 102 or 104.

The channel 100 is filled with oil by means of a make-up passage 112. The passage 112 is connected on its one end to a low pressure oil source and at its other end to port 114, which connects to channel 100 and to one end of an oil filter 113. The other end of filter 113 connects through a ball check valve to high pressure port 116. The instant invention rotary clutch is an improved version of applicant's clutch disclosed in U.S. Pat. No. 4,116,083, the text of which is incorporated herein by reference.

Operationally, the cam follower 42 is attached to planet shaft 52 and causes that shaft to oscillate. When the shaft 52 turns clockwise, as shown by arrow 118, a respective dam vane 80A positioned proximate the locations 102 and 104 contacts the interior wall of the ring housing, a respective vane 70 proximate the locations 106 and 108 also contacts the interior wall of the ring housing, thereby dividing channel 100 into two subchannels. As the rotor turns, the oil in those subchannels is pressurized due to the shape of the channel 100, causing the vanes 70 and 80 to be forced outwardly by that oil pressure into contact with the interior walls, thereby forming a plurality of spatially smaller subchannels 120A. Due to the angulated face of vane 70, the oil pressure has little area to act on to force vane 70 down. Those subchannels 120A have a generally wedge-like cross-sectional configuration as is observable in FIG. 20. In those subchannels 120A wherever the leading area of the subchannel (as defined by the direction of rotation) is relatively small and thus increases dimensionally over the length of the subchannel 120A (as the rotor rotates clockwise) the subchannel 120A is spatially decreased or narrowed upon rotation due to the structural configuration of the rotor 54 and the interior wall 99. Since the oil is substantially incompressible, any rotational displacement pressurizes the oil in the subchannel 120A to an extent wherein that pressure forms a hydraulic bond or linkage between the rotor 54 and the ring housing 90. Thereafter, a rotation of the rotor 54 causes a similarly directioned rotation of the ring housing.

When the rotor's 54 direction of travel is reversed, i.e. in the direction indicated by arrow 121, pressure begins building in the low pressure oil and acts on the power vanes 70. Due to the angulated face 82 of those vanes 70, the pressure on those faces forces the vanes 70 into their recess channels 64, thereby permitting the oil to flow over the vanes, there being no high pressure oil passage communicating with the underside of the vane to push the vanes outwardly from their channels. This condition permits the rotor to be freewheeling during its counterclockwise rotation. Upon reversing the angular direction of the shaft 52, the vanes 70 are once again pushed outwardly into contact with the interior wall 99, thereby establishing the hydraulic linkage.

In the instant clutch arrangement, Hoop and Hertzian stresses are substantially less in magnitude in comparison to those produced in comparative mechanical arrangements formed in overrunning clutches. Given that it therefore takes less force to unwedge the clutch, the wear life of the instant clutch is comparatively better than its mechanical counterpart.

BIASING MEANS

Various biasing means are within contemplation to retain the cam follower 42 in abutment against the cam 38. A mechanical biasing means is illustrated in FIG. 16 wherein an elongate compressed coil spring 129 is fixedly mounted to the transmission housing 34 to extend outwardly to contact a cam follower 42. A hollow cylindrical sleeve 130 surrounds the spring 129 over a portion of its length to restrict any lateral deflection of the spring as forces are applied thereto, e.g. by the cam follower 42.

A second biasing means is illustrated in FIGS. 18 and 19. In this embodiment, a spring 132 is retained within a cylindrically shaped housing 134. A threaded bolt 136 is threadedly inserted into the housing 134 to abut against a first end 138 of spring 132. The opposing end 140 of spring 132 abuts against the end of an elongate shaft 142. The opposing end of shaft 142 extends from and is fixed to housing 142A journaled on shaft 36. Shaft 142 is journaled into bearing 144 on which is mounted a disc-shaped beveled gear 146. The beveled teeth of gear 146 mesh with beveled gear segments 148 which are formed on cam followers 42. Due to the orientation and configuration of the gear 146 and its intercooperation with the gears 148, a clockwise directed moment shown by arrow 150 is transmitted to the cam follower 42 which urges the roller 48 into contact with cam 38. Thus, spring 132 need not change length much as the follower reciprocates back and forth.

In the embodiment shown in FIGS. 18 and 19, the cam followers 42 are reciprocating oppositely from one another, i.e. cam follower 42A would rotate clockwise while cam follower 42B would be rotating counterclockwise. As a result, the gear 146 is reciprocatably angularly rotated about an axis 147 and defined by the longitudinal axis of shaft 142. The magnitude of the moment may be varied by adjusting the location of the bolt 136 in the channel 138.

A third biasing means replaces mechanical linkage with a hydraulically activated system. The biasing system, as illustrated in FIGS. 4 and 5, includes three interconnected hydraulic positioners, generally 155 which are comprised individually of two hydraulically loaded vanes 150 slidably mounted in slots cut in planet shaft 52. Two hydraulically loaded vanes 156 are slidably mounted in positioner housing 158 journaled on shaft 52. Pressurized fluid flows in and out of chamber 159 through ports 160.

In the embodiment illustrated in FIGS. 1, 2, 4 and 5 a hydraulic positioner 155 is mounted to each of the cam follower shafts 52 which are spacedly positioned about a centrally positioned cam 38. The cam 38 is formed so that the total displacement of all hydraulic positioners 155 remains constant at all ratios and the ports in all hydraulic positioners 155 are interconnected by a common fluid supply line. A source of make up oil is connected to this line through a ball check valve to make up for leakage. The pressure of the oil in the hydraulic positioner may be controlled to vary with the output speed. The lower the output speed, the less spring force, or oil pressure required.

Operationally, the oil pressure pushes against vanes 150 to keep the follower wheel 48 in contact with the cam 38. As the volume of this hydraulic positioner changes the volume of the other two hydraulic springs changes oppositely so that the total displacement is constant. An accumulator may be used in the system if the volume does not remain constant.

A fourth embodiment of a biasing means, which is presently preferred, is illustrated in FIG. 9 and more specifically in schematic form in FIG. 12. In this embodiment a cylinder 162 having a hollow channel 163 therein is fitted with a pump piston 164 which is reciprocably mounted within that channel. One end of the cylinder 162 includes a plurality of female threads which threadedly receive a male threaded screw 166. The screw 166 is adjustable for adjusting the hydraulic pressure setting. A spring 168 is mounted between the screw 166 and the piston 164. The piston 164 includes an O-ring 169 mounted thereon adapted to form a sealed engagement with the interior wall 170 of the cylinder 162. A piston rod 173 extends outwardly from the piston 164 through an O-ring 172 mounted in cylinder 162 which forms a sealed engagement between the piston rod and the wall 170. Mounted on the free end 174 of rod 173 is a shoe 176 having a curved surface on its distal end configured to ride on an eccentric 178 which is eccentrically mounted on and keyed to the input shaft 32. A spring 180 mounted over the rod 173 has a first end which abuts against the exterior surface of cylinder 162. The opposing end of the spring abuts against the shoe 176. Spring 180 urges the shoe 176 against the cam 178 and functions to retain the shoe in physical engagement with that cam 178.

A hollow conduit 182 is mounted on the cylinder 162 and communicates with the hollow channel 163. A ball check valve 184 is mounted within conduit 182 proximate its mounting on the cylinder 162. The check valve illustrated includes a spring biased ball which functions to permit pressurized flow outward away from the channel 163, while precluding outside flow into the channel e.g. in the direction indicated by arrow 186. Conduit 182 branches into four conduits 187. Each conduit 187 is individually connected to a respective hydraulic cylinder 188. Mounted within each cylinder 188 is a respective piston 190 having a piston rod 192 which is mounted to a respective bell crank 192A keyed to follower shaft 52. Bell crank 192A may be the cam follower 42. As the bell crank 192A oscillates in a back and forward action as shown by arrow 193, the piston 190 alternates between pushing hydraulic fluid out of its cylinder 188 or being displaced by pressurized fluid entering the cylinder.

Being that the conduits 187 and 182 interconnect the various cylinders 188, the motion of each piston 192 at any given time during the operation of the system effects or is effected by the other pistons 192 in the system. For example, as one piston is driven into its cylinder 188 by the bell crank-cam follower 192A being displaced by the cam 38, the fluid is forced out of the cylinder 188 into the conduit 187. Since the check valve 184 precludes fluid from reentering the cylinder channel 163, the fluid is directed into one or more of the other cylinders 188. The cylinder 162/piston 164 arrangement functions as a pump such that the pistons 190 are continuously being urged outward toward their respective cam followers 192A by the pressurized fluid.

A second conduit 196 is mounted on the cylinder 162 to communicate with the channel 163 therein. The conduit 196 also communicates with a filter 198 which is positioned within a reservoir 199 of hydraulic fluid defined within the transmission housing. A check valve 200 is mounted within the conduit 196 to permit fluid to enter channel 163 from conduit 196 while precluding fluid from channel 163 to exit into conduit 196.

SPEED RATIO CONTROL MEANS

One embodiment of a mechanical ratio control system which may be utilized in the instant transmission is illustrated in FIGS. 18-19. The control system includes an elongate rigid feedback lever 201 pivotally mounted to housing 34 by pivot pin 203. On its first end 205, the lever 201 defines a slot 207 which slidingly cooperates with a pin 209 mounted on a bushing plate 211. The plate 211 is journaled on cam 38 such that cam 38 turns freely in plate 211 and any displacement of the cam 38 along input shaft 32 effects a corresponding displacement of the bushing plate 211 and hence an angular rotation of the lever 201. The opposing end of the lever 201 defines a slot 215 which slidingly receives a pin 217. The pin 217 extends outwardly from a nut-like bracket 219 having a female threaded channel 221 which passes through the length thereof. Threadedly inserted in channel 221 is a male threaded screw or shaft 223 whose first end 225 extends outward from the transmission through an opening 227 defined in the housing 34. The end 225 is adapted for connection with a manual or automatic control means adapted for shifting the transmission (not shown). Shaft 223 is displaceable relative to nut 219 in the directions indicated by double headed arrow 231.

The shaft 223, i.e. its second end 229, is journaled into rod 235, which is slidably journaled in housing 34 so that rod 235 moves axially with shaft 223. A pair of arc-shaped guides 233 are fixed at their ends to parallelly oriented elongate shafts 235 and 247. Guides 233 define elongate channels 237 therein which slidably receive and retain linear bearings 237A, each being retained on a respective elongate cylindrical pivot shaft 239. Mounted on a first end of shaft 239 are elongate steering rods 241. Parallel shafts 235 and 247 are slidably journaled in housing 34. The shaft 247 has been removed from FIG. 18 for clarity purposes. The guides 233 are longitudinally slidable in the direction of shafts 235 and 247 upon which they are fixed.

Steering rods 241 are fixedly mounted to elongate cylindrical steering shafts 251 having a bifurcated fork extension mounted thereon. Shafts 251 are journaled into bearings mounted in and within cam followers 42. As the guides 233 are displaced along the direction of rod 247, the guides cause the displacement of shaft 239, which causes angular rotation of steering rods 246 which angularly displace shafts 251, thereby steering the cam follower wheels 48.

Nut 219 is held by lever 201. In operation, screw 223 is turned to change ratios. Nut 219 is held by lever 201. The cam is being turned by the input shaft 32 in the direction shown by the arrow. If screw 223 moves to the left, FIG. 18, follower wheels 48 are steered toward the high ends of their respective lobes of cam 38, since the cam followers are axially fixed and cannot move toward the high end of the cam 38. The high end of the cam 38, which is axially slidable, moves toward the cam follower wheels 48, causing cam 38 to move to the left, causing lever 201 to rotate clockwise, pushing nut 219 and screw 223 to the right, straightening steering lever 241 and wheel 248 to run straight to cam 38 which maintains the selected ratio.

FIG. 11 illustrates schematically an alternative control means which is hydraulically actuated. As shown, a hydraulic pump 260 includes an elongate cylinder 262 which defines a hollow interior channel 264 therein. Fitted reciprocably within channel 264 is a solid piston 266 having a piston rod 268 which extends outwardly therefrom. Piston rod 268 extends through a port 271 defined within the end of cylinder 262. A seal 271A positioned within port 271 effects a liquid and pressure tight seal of the port 271 to the rod 268. The rod 268 is mounted on its free end 273 to a shoe 270 which has an arc-like surface configured to ride on an eccentric cam 272 mounted on and keyed to input shaft 32. Shoe 270 is urged outwardly away from pump 260 and hence toward cam 272 by a spring 274 which is interposed between the pump 260 and shoe 270. A second spring 275 is positioned within channel 264 to abut against a male threaded plug 276 which is threadedly inserted into the female threaded open end of cylinder 262. Spring 275 also abuts against piston 266, thereby urging that piston toward the input shaft 32. Resultingly, both springs 274 and 275 may urge the shoe 270 against the cam 272, thereby opposing the displacement of the shoe 270 by the lobe of the cam 38.

Channel 264 is ported on its two sidewalls by ports 278 and 279. Port 278 includes a spring biased ball check valve 280 therein oriented to preclude fluid outflow from the cylinder while allowing a fluid entry into the channel 264. Port 278 is connected by conduit 281 to a filter 283 which is submerged in a hydraulic fluid retaining reservoir 285. Port 279 also includes a spring biased ball check valve 287 which, in contradistinction to valve 280, is oriented to allow fluid outflow, while precluding fluid inflow, into the channel 264. Port 279 is connected by means of conduit 288 to valve 290. As illustrated, valve 290 defines a "T"-shaped conduit therein having an adjustable spring biased check valve 291 fitted within the leg portion of the conduit. The check valve 291 is oriented to allow a pressurized fluid outflow through the valve 290 which leads to a sump. The spring 296 of check valve 291 abuts against a control shaft 298 which is slidably and reciprocably mounted in channel 294. Shaft 298 in turn mechanically cooperates with a feedback link 300 by means of a pin 302 on a nut 219 threaded on control screw 298. The other end of screw 298 extends through housing 34 so that it can be turned by a controller. Pin 302 is received within a slot defined by a bifurcated fork configuration defined on the end of feedback link 300. Link 300 is pivotally mounted on housing 34 by pin 306. The valve 290 interconnects with a conduit 310 which branches into a plurality of subconduits 310A, each of which communicates with the chamber 311 of an individual piston-fitted cylinder 312 fixed to follower 42. Each piston 314 has a rod 316 which interconnects with a respective steering means (not shown) adapted to steer a respective cam follower wheel 48 on or relative to the input shaft retained cam 38.

Operationally, input shaft 32 turns eccentric 272 causing piston 266 to reciprocate to pump oil from reservoir 285 into valve 290. Spring 291 biases 320 so that a selected oil pressure is allowed in channel 310 and cylinders 311. The excess oil from pump 260 exits valve 290 through port 292. Pistons 314 are moved outwardly against spring 314A, all the same given distance, thereby turning the cam follower wheels 48 into similar orientation relative to rotating cam 38, displacing cam 38 axially. This causes linkage lever 300 to angularly rotate in the direction indicated by arrow 318, causing the control shaft 298 is inserted into channel 294, thereby increasing the compression on spring and force on ball 320. The ball 320 is sealingly urged into port 322 whereby the pressure of the fluid entering conduit 288 from pump 260 is increased. That fluid is directed into chambers 311 by means of conduit 310 and subconduits 310A. The fluid pressure urges the pistons 314 outward thereby steering the cam follower wheels 48 toward the high end of the cam.

As the cam moves under the steered follower wheel 48, it causes an angular rotation of the linkage shaft 300 in the direction indicated by arrow 324, which eases the compression on spring 296, thereby reducing the fluid pressure in valve 290 and fluid flows both from the pump and from the cylinders through the valve and into drain conduit 292. Resultingly, fluid provided by pump 260 and fluid from cylinders 311 is pushed by spring loaded pistons 314 directed from conduit 288 outward through valve 290 in conduit 292, straightening the cam follower wheels 48 so that the selected ratio is maintained.

An embodiment of a hydraulic steering control system is illustrated in FIGS. 8 and 13. As shown, two cam followers 42 are pivotedly mounted to an output shaft by one-way clutches 53. An input shaft 32A is mounted with a splined and slidable cam 38A. A pump driving cam or eccentric 272A is fixedly mounted on input shaft 32A. A shoe 270A is urged against that cam 272A by springs contained within pump housing 260A, which contains two cylinders and two pistons (both driven by shoe 270A), pump A and pump B similar to pumps shown in FIGS. 11 and 12. A conduit 288 which hydraulically communicates with pump 260A is mounted on that pump's casing 260A.

An elongate link 201A is pivotedly mounted to housing 34A by a pivot shaft 203A which passes through an opening in the linkage 201A and is thereafter mounted to the housing 34A. Mounted in a slot in a first end of linkage shaft 201A is a nut 219A having a female threaded opening therein which threadedly receives a male threaded elongate shaft 223A whereby the user may vary the location of the end of shaft 223A relative to the end of linkage shaft 201A. Shaft 223A extends through the opening 227A defined in the housing wall 34A. Mounted on the end of shaft 223A is an extension 229A on which is mounted coil spring 226A. This spring 226A is slidably retained on a smooth elongate, cylindrical shaft-like section of shaft 223A. Slidably mounted on the end of spring 226A is a valve cone 228A which is dimensioned to be slidably received within a port 230A defined within a valve housing 290 mounted on the sidewall of housing 34A. Valve cone 228A abuts against the spring 226A and is made slidably insertable into port 230A.

Fluid conduit 288 is connected to output shaft casing 232A. That casing is fixedly and stationarily mounted to housing 34A and defines a plurality of hollow annular channels 234 therein. The two outer channels hold "O" ring seals. The center, or control channel, 234A is accessed externally by a port connecting to conduit 288 in the casing 232A sidewall. Conduit 288 also communicates with valve body 290 by means of conduit 289 which is received in port 289A of casing 232A and a port of valve body 290. Fluid received through central channel 234A is directed into port 234AA which communicates with port 236A in shaft 36 and out into two similar casings 312A on each follower 42 and into cylinders 256A.

Fluid entering valve body 290 by means of conduit 289, and which flows over cone 228A, passes to a sump reservoir (not shown). By varying the pressure of insertion of cone 228A into port 322A, the user is able to control the fluid pressure in conduit 236A and in cylinders 256A and against spring loaded pistons 314A.

A piston-fitted cylinder 312A is mounted on each cam follower 42A, which in turn is rotatably mounted to output shaft 36A by a one-way clutch 53. Each piston 314A includes a piston rod 316A which extends outwardly from its respective cylinder to be pivotally received in a bracket mounting lever 340A. As shown, each bracket mounting 340A is keyed into an axle shaft 46A which is rotatably mounted within the bifurcated fork assembly of a respective cam follower 42. Each lever 340A is spring loaded by tension spring 311 against the force of hydraulic fluid against piston 314A. The axle shaft 46A includes a skewed shaft portion as illustrated in FIG. 10. A wheel 48A is mounted by anti-friction bearings 50 which resist axial as well as radial motion on the skewed shaft portion of axle shaft 46A. Understandably, a displacement of piston rod 316A operates to rotate the axle shaft 46A, thereby changing the orientation of the skewed axle shaft 46A and resultingly the orientation of the wheel 48A mounted on that skewed shaft 46A.

An actuation rod 209A is fixedly mounted on a bushing 211A which is journaled onto and which jointly moves with cam 38A. The actuation rod 209A extends downward and is slidably received within an elongate slot defined within shaft linkage 201A.

A second conduit 182A also communicates with a second fluid pump in pump housing 260A on its first end. The opposing end of the conduit 182A communicates with a pair of piston-fitted cylinders 188A fixed to housing 34A. Each piston includes a piston rod 192A which extends outwardly from the piston 190A (not shown) and is pinned to, or received, within a respective bifurcated fork-like assembly 244A which extends from each cam follower 42. A bolt or similar attachment means extends through openings defined in the fork-like assembly as well as through the openings in end of piston rod 192A to secure rotationally the piston rod 192A to the cam follower 42A.

Fluid directed through conduit 182A by the action of the pump 260B urges the pistons and their attendant piston rods 192A outward in the direction indicated by arrows 253A. The piston rods 192A operate to urge the cam followers 42A in the direction indicated by arrow 251A, thereby urging the cam followers 42A into contact with the cams 38A.

Upon the shaft 223A being either displaced into or out of the nut 219A in the direction indicated by arrows 254A, the cone valve 228A is pressed either more or less firmly against a valve seat 343 inside port 230A, as more clearly seen in FIG. 8. Pressurized fluid supplied to valve 290 by the pump 260A through intermediation of conduit 289, casing channels 234A and channel 288A is also either directed into the chamber of cylinder 256A, or alternatively, fluid from those chambers is withdrawn through port 291 of the valve 290. Under either circumstances the spring biased piston rod 316A is displaced relative to cylinder 312A, resulting in a corresponding shifting of bracket 340A with an attendant reorientation of the skewed axle shaft 46A and of the cam follower wheel 48A. The cam 38A being slidably splined to and turning with the rotating input shaft 32A is then displaced along shaft 32A due to the force generated by the interaction of the steered cam follower wheels 48A on the cam 38A surface.

Two preferred embodiments of a steering control system are illustrated in FIGS. 1, 2, 3, 4 and 6. In these embodiments a fluid pump intercooperates with and is driven by the input shaft 32 as previously described for the embodiment of FIGS. 13-15. Fluid from the pump is directed by a first plurality of conduits to piston-fitted cylinders 312B, each of which includes a piston rod 316B mounted on a respective piston 314B. In the embodiment shown in FIG. 1, each piston rod 316B extends outward from its respective cylinder to abut against a "T"-shaped lever 351 which is pivotally mounted to a respective cam follower 42. Lever 351 is pivoted around axle 352. As illustrated, each lever 351 is biased against its piston rod 316B by a spring 353. Lever 351 is fitted with a finger 355 which mechanically engages an endless chain 357 which is trained about the annular section 358 of the cam follower 42 which surrounds the planet shaft 52. The endless chain 357 is also trained about a toothed sprocket 359 which is fixedly mounted to the axle shaft 46 supporting the cam follower wheel 48. As previously described, axle shaft 46 includes a skewed shaft portion which is journaled through a bearing 361 which supports a crowned cam follower wheel 48.

Figure 2:
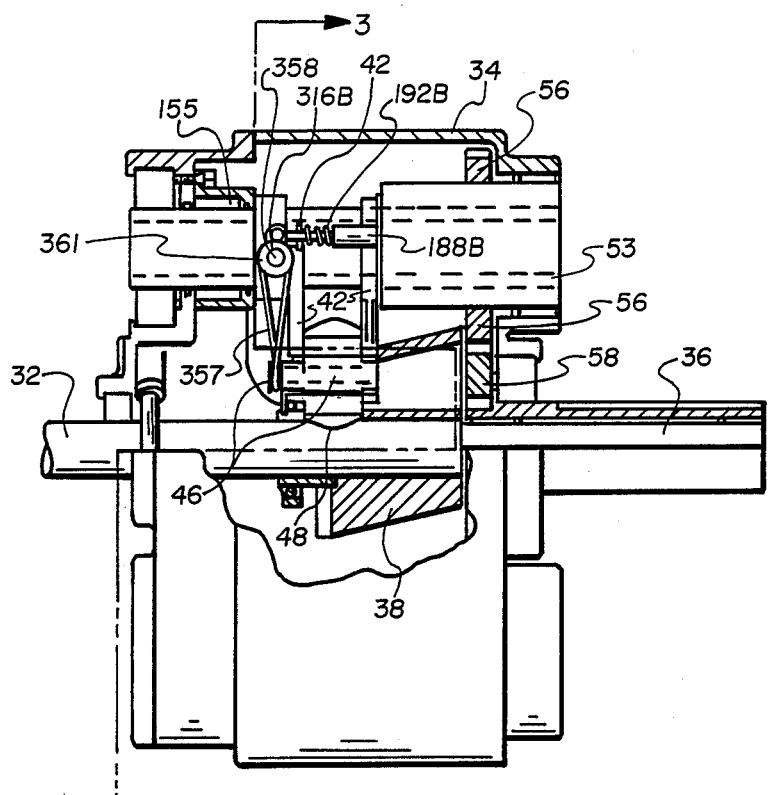
FIG. 2 is a side view, partly in cross-section, of the transmission shown in FIG. 1.
Figure 3:
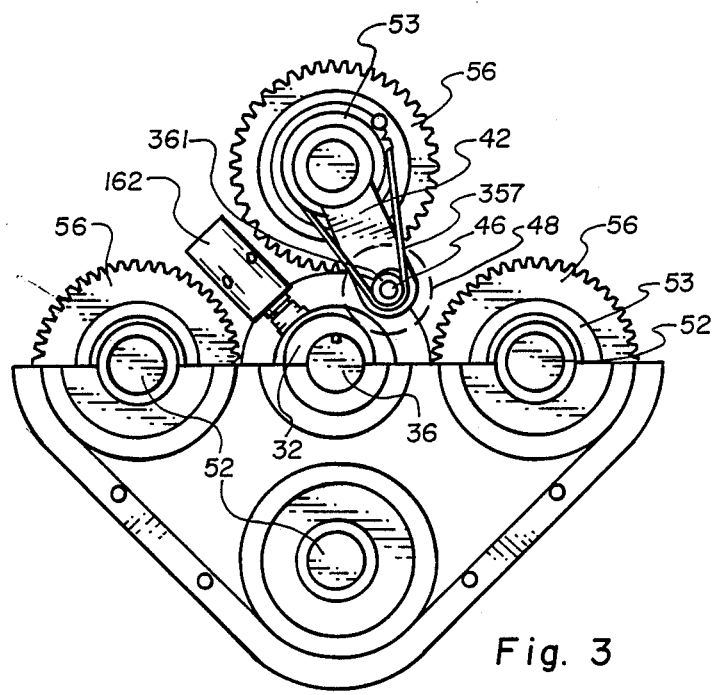
FIG. 3 is a fragmentary cross-sectional view of the transmission in FIG. 2 taken along sectional lines 3—3.

An alternative embodiment of the control system is illustrated in FIGS. 2, 3 and 6. As shown, the piston rod 316B passes through a spring 365 which abuts against the extension 351 of the follower 42 on its first end and the piston 314B on its second end. Pivotally mounted to the free end of piston rod 316B is a bell crank 358, which is fixedly mounted to a toothed sprocket 361. An endless chain 357 is trained over the sprocket 361 and likewise over a toothed sprocket 359 similar to the arrangement shown in FIG. 1.

CONSTANT RATIO TRANSMISSION EMBODIMENT

The transmission of the instant invention can be adapted as a family of constant ratio transmissions. An embodiment of the invention adapted for this purpose is illustrated in FIGS. 23 and 24. As shown, a cam 38 is slidably splined to an input shaft 32. Abutting each end of the cam is a respective bushing plate 211. Positioned in abutment against each bushing plate 211 is a thrust bearing 370. In FIG. 23, a male threaded bolt shaft 372 is threadedly inserted through a female threaded aperture 374 within housing wall 34. The exterior of aperture 374 is marked like a micrometer, the distance between the marks is the pitch of the bolt threads. The bolt head is countersunk to clear aperture 374 and its angled face is marked to subdivide the marks on 374. The markings are provided to indicate the particular ratio at which the transmission is set. Each bolt 372 abuts against a respective thrust bearing 370. The bolts 372 are positioned to exert oppositely directed retaining forces against the cam 38 to thereby retain that cam 38 in a selected position on the input shaft 32. The particular position of that cam 38 may be altered by appropriate adjustment of two micrometer-like positioners 372.

Operationally, the positioner 372 operates similar to a micrometer.

As shown in FIGS. 22 and 24, each positioner 372 includes the two open-ended cylindrical members 372A and 372B, which each respectively define a hollow channel therein. The cylindrical members 372A includes a female threaded socket configured to threadedly receive a male threaded shaft mounted within the interior channel of cylindrical member 372B. The interior channel of 372B is dimensioned to receive cylindrical member 372A therein. The length of member 372A includes a plurality of numbered measurement markings thereon which in conjunction with a plurality of numbered markings arranged about the end of member 372B provide a means of measuring the axial displacement of one cylindrical member vis-a-vis the other, as the male threaded shaft is either inserted into or retracted from the female socket. Utilizing the numbered markings, the user is able to select a predetermined length for the positioner 372 and thereby determine the positioning of a respective cam 38 relative to the housing wall 34. In this embodiment, the user may select a desired drive ratio, and thereafter arrange the cam positioning relative to the cam followers 42 so as to achieve the desired output shaft speed and torque. Thereafter, the user adjusts the positioner 372 such that the cam 38 is held in place in the desired location. The positioner 372 provides means of providing a fixed ratio speed ratio reducer with a minimum of parts.

In a second embodiment of the constant ratio drive, shown to advantage in FIG. 24, a plurality of marked spacers 381 of precise accelerated lengths are inserted between the rotating cam 38 and the sidewalls of housing 34 and/or gear 58. As shown, the spacers 381 are adapted to retain the cam 38 in a selected position relative to the followers 42.

The use of the spacers or the bolts provides a manufacturer with the ability of producing a multiplicity of different ratioed speed reducers with a minimum of parts in that the appropriate length spacers are inserted into a standard transmission structure to achieve the desired speed ratio.

Since the cam 38 is fixed in place relative to the shaft 32 and the cam followers likewise being retained from any lateral displacement, i.e. in the direction indicated by arrows 380, a rotation of the input shaft 32 causes a constant angular rotation of the output shaft 36.

Each of the embodiments shown in FIG. 23 and FIG. 24 shows a pair of gears 56 and 58 coupling shafts 52 and 36 (journaled on and concentric with input shaft 32) and this feature may be part of any embodiment of my invention. Likewise, gears 56 and 58 may be omitted and shaft 52 extended to become the output shaft.

FORWARD AND REVERSE SHIFTING MECHANISM

Each embodiment of the invention may be fitted with a forward-reverse shifting mechanism 382 of the type illustrated generally in FIG. 25. A rotationally mounted secondary planetary gear 384 is mounted on axle 386 fixed to and extending from the shift lever 395 journaled on output shaft 36. Planetary gear 384 is meshed with planetary gear 58 keyed to output shaft 36. A pair of planetary gears 388 and 389 are also rotationally mounted to the shift lever 395 by means of their respective axles 390 and 392. Planetary gear 389 is meshed with planetary gear 58, and with gear 388. Lever 395 is mounted on shaft 36 and is movable through a slot in the housing 34 in the directions indicated by arrow 393. Recognizably, the gears 384 and 388 are positioned sufficiently apart from one another that the sun gear 56 can only mesh with one of the gears at any particular moment. When the sun gear 56 meshes with gear 384, the direction of rotation of gear 58 corresponds to that of the gear 56, e.g. a counterclockwise rotation of gear 56 results in a corresponding counterclockwise rotation of output gear 58, by means of the action of the clockwise rotation of gear 384. When the output gear 58 meshes with gear 389, the direction of rotation of gear 58 is opposite that of gear 56, e.g. a counterclockwise rotation of gear 56 causes a clockwise rotation of gear 388 which in turn effects a counterclockwise rotation of gear 389. In turn, gear 389 causes a clockwise rotation of gear 58. It follows that a user can vary the direction of rotation of the output gear 58, and resultingly, the output shaft 36 from clockwise to counterclockwise rotation, by selecting which of the two gears, i.e. gears 386 and 389 with which the sun gear 58 will mesh. Gear 56 is keyed to shaft 32A which is driven by the one-way clutches in followers 42. This particular shifting is adaptable to any of the embodiments of the transmission illustrated herein, recognizing that each gear 56 of the respective transmission arrangement must mesh with its own respective trio of secondary planetary gears, namely gears 384, 388 and 389 journaled on its own lever 395 journaled on the output shaft.

SLIDABLE CAM FOLLOWER EMBODIMENT

FIG. 29 illustrates an embodiment of the transmission wherein the cam followers 42 are made slidable along their support shaft 36 as opposed to the cam 38 being slidably displaceable along its support shaft, i.e., input shaft 32.

In this particular construction, the cam 38 is fixedly mounted on input shaft 32. This mounting may be accomplished in various ways. In one embodiment, the cam 38 may be welded, riveted or otherwise keyed into the shaft 32.

In another construction, the cam 38 and shaft 32 may be splinedly connected one to another as previously described. Thrust bearings 400 mounted within the housing 34 are positioned on opposing ends of the cam in an abutment-type relationship. The bearings 400 are spacedly positioned apart from one another so as to retain the cam 38 therebetween in a selected position. The bearings 400 retain the cam 38 in that position, notwithstanding the force applications of the cam 38 by the steerable roller wheels 48 of cam followers 42.

A hollow shaft 402 is slidably splined on output shaft 36 in a concentric orientation, i.e. shaft 36 passes through the interior of shaft 402 and both shafts share a common central longitudinal axis. Shaft 402 is made slidably displaceable along the length of shaft 36 due to the use of longitudinally oriented splines. A pair of one-way clutches is mounted on the exterior of the shaft 402, one clutch for each cam follower 42. A cam follower 42 is positioned over each respective one-way clutch. The cam followers 42 are axially restrained on the shaft 402 relative to one another. Each cam follower 42 includes a steerable rotatably mounted wheel or roller 48 mounted on the end thereof. The wheel mountings in FIG. 29 are structurally similar to those previously described in the discussion of FIG. 19. Steering means of any of the types previously described may be used in the embodiment to steer the wheels 48.

Operationally, as the wheels 48 are steered to a new orientation, the forces created by the interaction of the wheels on the sloping cam are transferred to the cam followers 42. The forces, having an axially directed vector component, cause the cam followers 42 to be displaced along the length of the shaft 36. As the cam followers 42 shift their location, understandably the positioning of the wheel 48 relative to the cam 38 also changes, either increasing or decreasing the throw of that follower 42 relative to the axis of rotation of the cam 38. Springs urging follower wheels 48 against the cam travel with 42.

Except for the displaceability of the cam followers relative to the cam, this present embodiment functions like the embodiment of FIG. 1, as to the basic operation of the transmission.

MULTI-OUTPUT SHAFT TRANSMISSION

FIGS. 30–31 disclose a means of providing a transmission having a plurality of output shafts 36. As shown in FIG. 29, two of cam followers 42, each being axially restrained on and connected to a respective concentric shaft 402 by one-way clutches where shafts 402 are slidably splined on output shaft 36 journaled on housing 34 of the transmission. As shown, the pairs of cam followers 42 are positioned diametrically opposite one another about a common cam 38. The structure of the cam follower 42 and output shaft 36 arrangement is similar to that shown in FIG. 29. By this arrangement, the user is provided with two separate and adjustable output shafts 36 whose respective torques and rotational speeds can be individually adjusted by appropriate steering of the respective cam followers 42 along the surface of the central cam 38.

FIG. 31 illustrates a modified embodiment of the transmission of FIGS. 29 and 30. In this construction, four distinct pairs of cam followers 42 are arranged about the central cam 38. As shown, the pairs of cam followers 42 are spaced approximately 90° from each other about the longitudinal, rotational axis of the cam. Each pair of cam followers are positioned diametrically opposite another pair of cam followers. Each of the cam followers is fitted with a respective steerable wheel 48 which is steered by a steering mechanism of any of the types previously discussed. These steering mechanisms have been removed from FIG. 31 for clarity purposes. Each pair of cam followers 42 are mounted on and axially fixed on a respective concentric shaft 402 by means of a one-way clutch similar to the preceding disclosed embodiments. Each shaft 402 with its pair of cam followers is displaceable along its output shaft 36, under the force applications engendered by the steering of a respective wheel 48. The construction shown in FIG. 31 provides the user with the means to have a plurality of output shafts, the torque and rotational velocities of which are each individually controllable by means of appropriate manipulations of a respective steering means.

Understandably, embodiments having more than four output shafts are constructable utilizing the basic concepts disclosed in the constructions of FIGS. 29, 30 and 31. For clarity's sake, biasing means urging the cam follower wheels against the cam are not shown, nor are the control means shown.

TRANSMISSION HAVING A TORQUE DAMPENED INPUT SHAFT

In operation, the transmission of the invention may produce torques on the input shaft 32 which may be translated back to the motor on which the input shaft 32 is mounted. In those situations wherein it is advisable to eliminate those torques, the instant transmission may be fitted with a dampening means.

FIG. 32 illustrates a transmission of the invention having an input shaft 32, cam 38 and two-cam followers 42 which are each mounted to their respective planetary shafts 52 by clutches 53. The cam 38 in this embodiment is splined to input shaft 32 to permit its displacement along a length of that shaft 32. The cam 38 is modified to include an elongate neck-like section 404 which extends along a length of the input shaft 32. An annular spur gear 406 having teeth about its circumference is mounted to section 404. The modified cam composed of cam 38, neck section 44 and spur gear 406 are all of a unitary construction and slidably mounted on the shaft 32.

An axle shaft 408 is mounted to housing 34 to extend outwardly therefrom. Rotatably mounted on that shaft is a gear 410 which meshed with the teeth of gear 406. A gear 412 is fixed to gear 410. Gears 410 and 412 are slidably mounted on shaft 408 for displacement along a length of that shaft 408. A collar 414 is mounted on each side of gear 410. The collars 414 are adapted to cause the gears 410 and 412 to be longitudinally displaced with the cam gear 406.

Neck section 404 is fixed to a lobed cam 416. Bearings 418 are interposed between the cam 416 and the neck section 404 whereby the cam is free to rotate at a rotational speed different from that of the cam 38. Cam 416 includes a spur gear 420 mounted on an end thereof which meshes with the teeth of gear 412.

A cam follower 422 is journaled onto a support shaft 424 which is fixed into housing 34. cam follower 422 includes a biasing means of the types previously disclosed above which biases the cam follower wheel 426 into contact with the cam 416.

The gear ratios of gears 406, 410, 412 and 420 are configured to provide a rotational speed to the cam 416 which in association with the mass of the cam follower 422 are adapted to compensate for the torques being applied to the shaft 32 by followers 42. The computation of the appropriate cam follower 422 mass and the rotational speed of the cam 416 is a matter of conventional dynamics and mathematics.

For the construction shown in FIG. 32, FIG. 33 illustrates a graph of the angular velocity (1) a first cam follower 42 indicated by a solid line (425); (2) a second cam follower indicated by a dotted line (line 428); and (3) the cam follower 422 indicated by a broken solid line having dotted regions (line 426).

The flat regions identified as 430 are those wherein the cam follower is actually driving the output shaft 1. Observably, from the graph, the cam follower 422 has a period which is one-half that of either of the two cam followers 42, which leads to the conclusion that the rotational speed of cam 422 must be twice that of cam 38. The mass of follower 422 is the same as the mass of one of the cam followers 42. For those embodiments having more or less cam followers, the appropriate graphs of the cam followers' angular velocities are drawn and the appropriate speed and mass characteristics of the cam and cam follower may be calculating using conventional dynamics.

It is to be understood that the embodiments of the invention described herein are merely illustrative of the application of the principles of the invention. Reference herein to details of the illustrated embodiment is not intended to limit the scope of the claims which themselves recite those features regarded as essential to the invention.

What is claimed is:

1. A transmission comprising: a housing;
an input shaft journaled through a wall of said housing;
an output shaft journaled through a wall of said housing;
a cam, having at least one lobe slidably splined on said input shaft;
at least one cam follower pivotally mounted and axially fixed within said housing, each said cam follower having a steerable roller means for engaging a surface of said cam;
biasing means mounted on said housing for biasing said cam follower into contact with said cam; and
connection means for interconnecting said cam follower and said output shaft.

2. The variable speed transmission according to claim 1 wherein said transmission further includes steering means mechanically associated with said cam rollers for steering said steerable followers on said cam surface, wherein a change of said roller orientation controlled by said steering means effects a displacement of said cam along said input shaft.

3. The transmission according to claim 2 wherein said steering means is mechanically associated with said cam, wherein a displacement of said cam along said input shaft causes said steering means to turn said steerable rollers, thereby providing a feedback means to establish and maintain a selected displacement of said cam follower along said input shaft.

4. The transmission according to claim 1 wherein said steerable roller comprises:
a wheel support rotatably mounted and axially fixed on said cam follower; and
a wheel rotatably and axially fixed mounted on said wheel support, wherein said wheel support includes a skewed axle segment, rotatably mounted within a bifurcated fork extending from and part of the said cam follower.

5. The transmission according to claim 4 wherein said support comprises:
an elongate shaft having a fork-shaped extension mounted thereon, said shaft being rotatably mounted within a recess channel in said cam follower;
an axle, rotatably mounted within said extension; and
a cam follower roller, journaled on said axle.

6. The transmission according to claim 1 wherein said connection means comprises a one-way clutch.

7. The variable speed transmission according to claim 6 wherein said one-way clutch comprises:
a second housing, defining a cavity therein, said second housing being coupled to said output shaft;
a rotor mounted on said cam followers, said rotor being positioned within said second housing cavity;
a plurality of spring loaded vanes, each vane being reciprocably mounted within a respective recess housing within said rotor; each said recess housing being ported to a channel to one side of said recess housing defined between said rotor and said second housing filled with fluid; an end of each said vane being adapted to be inserted into said channel to abut against said second housing to form an obstruction in said channel, said end having an angulated configuration; and
wherein an insertion of said vanes into said channel defines a plurality of wedge-shaped subchannels, a rotation of said rotor in a first direction creates an increase in pressure with said subchannels sufficient to establish a hydraulic linkage of said rotor with said second housing.

8. The transmission according to claim 7 wherein said vanes are of two configurations, a first configuration having a length sufficient to be inserted into said channel and being configured to limit the travel of said vanes so as to contact said second housing at a limited number of locations along a length of said channel and a second configuration having a length dimensioned to be mounted into said channel and contact said second housing at any location along said length of said channel.

9. The transmission according to claim 8 wherein each vane of said first configuration is paired with a vane of said second configuration.

10. The transmission according to claim 9 wherein for each said pair of vanes, an end of one vane is angulated substantially opposite to the angulation of the end of said second vane.

11. The transmission according to claim 10 wherein vanes of each configuration are angulated in a common orientation.

12. The transmission according to claim 7 wherein said cavity is oblate in configuration.

13. The transmission according to claim 12 wherein said rotor is generally circular in configuration.

14. The transmission according to claim 8 wherein a rotation of said rotor in a second direction does not create a hydraulic linkage between said rotor and said second housing.

15. The transmission according to claim 7 wherein said one-way clutch comprises:
a pivot shaft mechanically engaging said cam follower;
a bearing mounted on said pivot shaft;
a roller clutch in said bearing housing for mechanically interconnecting said cam followers with said pivot shaft.

16. A transmission according to claim 2, further comprising:
a wheel support;
an arm having one end fixedly mounted to an end of said wheel support;
a screw journaled in and extending through a wall of said housing;
a nut threaded onto the screw inside said housing;
a link pivotally connected intermediate its ends to said housing, said link being mechanically associated on a first end with said nut, said link being mechanically associated on a second end with said cam.

17. The transmission according to claim 7 wherein said one-way clutch comprises:
a pivot shaft mechanically engaging and fixed to said cam follower;
a bearing mounted on said pivot shaft;
a sprag clutch in said bearing housing for mechanically interconnecting said cam followers with said output shaft.

18. A transmission according to claim 7 wherein said one-way clutch comprises: a pivot shaft journaled in said cam follower, a journal housing, a sprag clutch in said journal housing for mechanically connecting said cam followers with said pivot shaft.

19. A transmission comprising:
an input shaft;
a housing;
a cam, having at least one lobe, slidably splined on said input shaft;
at least two cam followers each having a respective steerable contact member which mechanically engages a surface of said cam;
biasing means for maintaining contact between said cam and said contact member;
said steerable contact member being journaled on and axially fixed to a skewed segment of a shaft journaled in and axially fixed to a respective cam follower;
output means mechanically associated with said cam followers for transferring power from said cam followers.

20. A transmission comprising:
a housing;
an input shaft journaled through a wall of said housing, said input shaft, having a longitudinal axis;
an output shaft journaled through a wall of said housing;
a cam, having at least one lobe, slidably splined on said input shaft to be slidable thereon along said longitudinal axis;
at least two cam followers pivotedly mounted within said housing, each of said cam followers having a contact means for engaging a surface of said cam, said contact means being a steerable roller rotatably mounted on said cam follower, said roller including control means for altering its orientation vis-a-vis said cam. said cam followers being axially fixed relative to said input shaft;
retaining means mechanically associated with said cam for releasably retaining said cam at a selected position along a length of said input shaft; and
connection means for interconnecting said cam follower and said output shaft.

21. The transmission of claim 20 wherein said retaining means includes at least one threaded bolt threadingly engaged in a female threaded aperture defined within said housing, and a thrust bearing abutting against said cam wherein said bolt engages said thrust bearing, said bolt and female threaded part are inscribed with markings to indicate speed ratio selected, thereby retaining said thrust bearing and said cam in a selected positioning.

22. A transmission comprising:
a housing;
an input shaft journaled through a wall of said housing;
an output shaft journaled through a wall of said housing;
a cam, having at least one lobe, fixedly mounted on said input shaft;
at least one cam follower pivotally mounted and axially fixed on a concentric shaft slidably splined on said output shaft, each said cam follower having a steerable roller means for engaging a surface of said cam; and
a one-way clutch connection means for interconnecting said cam follower and said concentric shaft.

23. The variable speed transmission according to claim 22 wherein said transmission further includes steering means mechanically associated with said steerable roller means for steering said steerable followers on said cam surface, wherein a change of said roller orientation controlled by said steering means effects a displacement of said cam along said input shaft.

24. The transmission according to claim 23 wherein said steering means is mechanically associated with said cam, wherein a displacement of said cam along said input shaft causes said steering means to turn said steerable roller means, therby providing a feedback means to establish and maintain a selected displacement of said cam follower along said input shaft.

25. The transmission according to claim 22 wherein said roller means is mounted in a support comprising:
an elongate shaft having a fork-shaped extension mounted thereon, said shaft being rotatably mounted within a recess channel in said cam follower;
an axle, rotatably mounted within said extension; and
a cam follower wheel, or roller, journaled on said axle.

26. The variable speed transmission according to claim 23 wherein said one-way clutch comprises:
a second housing, defining a cavity therein, said second housing being coupled to said output shaft;
a rotor mounted on said cam followers, said rotor being positioned within said second housing cavity;
a plurality of spring loaded vanes, each vane being reciprocably mounted within a respective recess housing within said rotor; each said recess housing being ported to a channel to one side of said recess housing defined between said rotor and said second housing filled with fluid; an end of each said vane being adapted to be inserted into said channel to abut against said second housing to form an obstruction in said channel, said end having an angulated configuration; and
wherein an insertion of said vanes into said channel defines a plurality of wedge-shaped subchannels, a rotation of said rotor in a first direction creates an increase in pressure with said subchannels sufficient to establish a hydraulic linkage of said rotor with said second housing.

27. The transmission according to claim 26 wherein said vanes are of two configurations, a first configuration having a length sufficient to be inserted into said channel and being configured to limit the travel of said vanes so as to contact said second housing at a limited number of locations along a length of said channel and a second configuration having a length dimensioned to be mounted into said channel and contact said second housing at any location along said length of said channel.

28. The transmission according to claim 26 wherein said one-way clutch comprises:
a pivot shaft mechanical engaging said cam follower;
a bearing mounted on said pivot shaft;
a roller clutch in said bearing housing for mechanically interconnecting said cam followers with said pivot shaft.

29. A transmission according to claim 22, further comprising:
a wheel support;
an arm having one end fixedly mounted to an end of said wheel support;
a screw journaled in and extending through a wall of said housing;
a nut threaded onto the screw inside said housing;
a link pivotally connected intermediate its ends to said housing, said link being mechanically associated on a first end with said nut, said link being mechanically associated on a second end with said cam.

30. The transmission according to claim 26 wherein said one-way clutch comprises:
a pivot shaft mechanical engaging and fixed to said cam follower;
a bearing mounted on said pivot shaft;
a sprag clutch in said bearing housing for mechanically interconnecting said cam followers with said output shaft.

31. A transmission comprising:
a housing;
an input shaft journaled through a wall of said housing;
a plurality of output shafts, each journaled through a wall of said housing;
a cam, having at least one lobe, fixed on said input shaft;
a plurality of cam followers, each said cam follower being pivotally mounted on and axially fixed on a concentric shaft slidably splined on an output shaft within said housing, each said cam follower having a steerable roller means for engaging a surface of said cam; and
one-way clutch connection means for mechanically connecting each of said concentric shafts with one or more of said cam followers, thereby providing means of transferring power from said input shaft to a plurality of output shafts; and
a plurality of independent ratio control means, one said ratio control means being mechanically associated with each said cam follower for controlling a positioning of said cam follower vis-a-vis said cam.

32. The variable speed transmission according to claim 31 wherein said transmission further includes steering means mechanically associated with said cam rollers for steering said steerable followers on said cam surface, wherein a change of said roller orientation controlled by said steering means effects a displacement of said cam along said input shaft.

33. The transmission according to claim 32 wherein said steering means is mechanically associated with said cam, wherein a displacement of said cam along said input shaft causes said steering means to turn said steerable rollers, thereby providing a feedback means to establish and maintain a selected displacement of said cam follower along said input shaft.

34. The transmission according to claim 31 wherein said steerable roller comprises:
a wheel support rotatably mounted and axially fixed on said cam follower; and
a wheel rotatably and axially fixedly mounted on said wheel support, wherein said wheel support includes a skewed axle segment, rotatably mounted within a bifurcated fork extending from and part of the said cam follower.

35. The transmission according to claim 34 wherein said support comprises:
an elongate shaft having a fork-shaped extension mounted thereon, said shaft being rotatably mounted within a recess channel in said cam follower;
an axle, rotatably mounted within said extension; and
a cam follower roller, journaled on said axle.

36. The variable speed transmission according to claim 31 wherein said one-way clutch comprises:
a second housing, defining a cavity therein, said second housing being coupled to said output shaft;
a rotor mounted on said cam followers, said rotor being positioned within said second housing cavity;
a plurality of spring loaded vanes, each vane being reciprocably mounted within a respective recess housing within said rotor; each said recess housing being ported to a channel to one side of said recess housing defined between said rotor and said second housing filled with fluid; an end of each said vane being adapted to be inserted into said channel to abut against said second housing to form an obstruction in said channel, said end having an angulated configuration; and
wherein an insertion of said vanes into said channel defines a plurality of wedge-shaped subchannels, a rotation of said rotor in a first direction creates an increase in pressure with said subchannels sufficient to establish a hydraulic linkage of said rotor with said second housing.

37. The transmission according to claim 36 wherein said vanes are of two configurations, a first configuration having a length sufficient to be inserted into said channel and being configured to limit the travel of said vanes so as to contact said second housing at a limited number of locations along a length of said channel and a second configuration having a length dimensioned to be mounted into said channel and contact said second housing at any location along said length of said channel.

38. The transmission according to claim 36 wherein said one-way clutch comprises:
a pivot shaft mechanical engaging said cam follower;
a bearing mounted on said pivot shaft;
a roller clutch in said bearing housing for mechanically interconnecting said cam followers with said pivot shaft.

39. A transmission according to claim 31, further comprising:
a wheel support;
an arm having one end fixedly mounted to an end of said wheel support;
a screw journaled in and extending through a wall of said housing;
a nut threaded onto the screw inside said housing;
a link pivotally connected intermediate its ends to said housing, said link being mechanically associated on a first end with said nut, said link being mechanically associated on a second end with said cam.

40. The transmission according to claim 31 wherein said one-way clutch comprises:
a pivot shaft mechanically engaging and fixed to said cam follower;
a bearing mounted on said pivot shaft;
a sprag clutch in said bearing housing for mechanically interconnecting said cam followers with said output shaft.

41. The transmission according to claim 20 wherein said retaining means is a plurality of spacers and thrust bearings, each spacer abutting against said cam and said housing, said plurality of spacers and thrust bearings retaining said cam in a selected fixed position on said input shaft, said spacers being stamped with a given ratio.

42. The transmission according to claim 19 wherein said contact means is a steerable roller.

43. The transmission according to claim 1, wherein said transmission further includes a torque dampening means comprising:
an auxiliary cam mounted on said input shaft;
an auxiliary cam follower pivotally mounted within said housing;
means for rotating said auxiliary cam at an angular velocity different from an angular velocity of said cam;

wherein said torque dampening means dampens torques imparted to said input shaft by said cam followers and thereby prevents a transmission of said torques to a prime mover of said input shaft.

44. The transmission according to claim 22, wherein said transmission further includes a torque dampening means comprising:
an auxiliary cam mounted on said input shaft;
an auxiliary cam follower pivotally mounted within said housing;
means for rotating said auxiliary cam at an angular velocity different from an angular velocity of said cam;
wherein said torque dampening means dampens torques imparted to said input shaft by said cam followers and thereby prevents a transmission of said torques to a prime mover of said input shaft.

45. The transmission according to claim 31, wherein said transmission further includes a torque dampening means comprising:
an auxiliary cam mounted on said input shaft;
an auxiliary cam follower pivotally mounted within said housing;
means for rotating said auxiliary cam at an angular velocity different from an angular velocity of said cam;
wherein said torque dampening means dampens torques imparted to said input shaft by said cam followers and thereby prevents a transmission of said torques to a prime mover of said input shaft.

* * * * *